United States Patent
Erceg et al.

(10) Patent No.: US 10,577,193 B1
(45) Date of Patent: Mar. 3, 2020

(54) CROSS-BELT SORTATION TRAY

(71) Applicant: Mantissa Corporation, Charlotte, NC (US)

(72) Inventors: David Patrick Erceg, Concord, NC (US); Gonzalo Sotelo, Charlotte, NC (US); J. David Fortenbery, Charlotte, NC (US)

(73) Assignee: Mantissa Corporation, Charlotte, NC (US)

( * ) Notice: Subject to any disclaimer, the term of this patent is extended or adjusted under 35 U.S.C. 154(b) by 292 days.

(21) Appl. No.: 15/430,587

(22) Filed: Feb. 13, 2017

Related U.S. Application Data

(60) Provisional application No. 62/293,995, filed on Feb. 11, 2016.

(51) Int. Cl.
*B65G 47/96* (2006.01)
*B65G 17/34* (2006.01)
*B65G 43/08* (2006.01)

(52) U.S. Cl.
CPC ......... *B65G 47/962* (2013.01); *B65G 17/345* (2013.01); *B65G 43/08* (2013.01)

(58) Field of Classification Search
CPC .... B65G 17/345; B65G 43/08; B65G 47/945; B65G 47/962; B65G 47/94; B65G 47/96
USPC ...................... 198/370.04, 370.06
See application file for complete search history.

(56) References Cited

U.S. PATENT DOCUMENTS

| | | | | |
|---|---|---|---|---|
| 5,054,601 | A | | 10/1991 | Sjogren et al. ............... 198/365 |
| 5,701,992 | A | * | 12/1997 | Enomoto ............. B65G 17/345 198/370.06 |
| 5,836,436 | A | | 11/1998 | Fortenbery et al. ..... 198/370.03 |
| 6,253,901 | B1 | * | 7/2001 | Hintz ................... B65G 17/345 198/370.06 |
| 6,390,275 | B1 | * | 5/2002 | Bonnet ............... B65G 17/345 198/370.04 |
| 8,776,694 | B2 | * | 7/2014 | Rosenwinkel ........ B65G 47/96 104/88.02 |
| 8,807,320 | B2 | * | 8/2014 | Fortenbery .......... B65G 47/962 198/370.03 |
| 9,452,893 | B1 | * | 9/2016 | Fujihara ................ B65G 43/08 |
| 9,511,949 | B2 | * | 12/2016 | Fujihara ............... B65G 17/345 |
| 9,828,187 | B2 | * | 11/2017 | Chierego ............... B65G 43/08 |
| 2003/0221935 | A1 | * | 12/2003 | Barklin ................ B65G 17/345 198/357 |
| 2016/0280472 | A1 | * | 9/2016 | Porat .................... B65G 47/962 |

* cited by examiner

*Primary Examiner* — Gene O Crawford
*Assistant Examiner* — Keith R Campbell
(74) *Attorney, Agent, or Firm* — MacCord Mason PLLC

(57) ABSTRACT

A sorting conveyor for transporting objects and unloading objects adjacent the conveyor. The sorting conveyor includes a conveyor track, conveyor carts having a sortation tray, and a drive motor. In particular embodiments, the cross-belt assembly includes a belt roller, a drive roller, a timing belt, and a removable transport belt to unload objects toward at least one side of the conveyor.

71 Claims, 30 Drawing Sheets

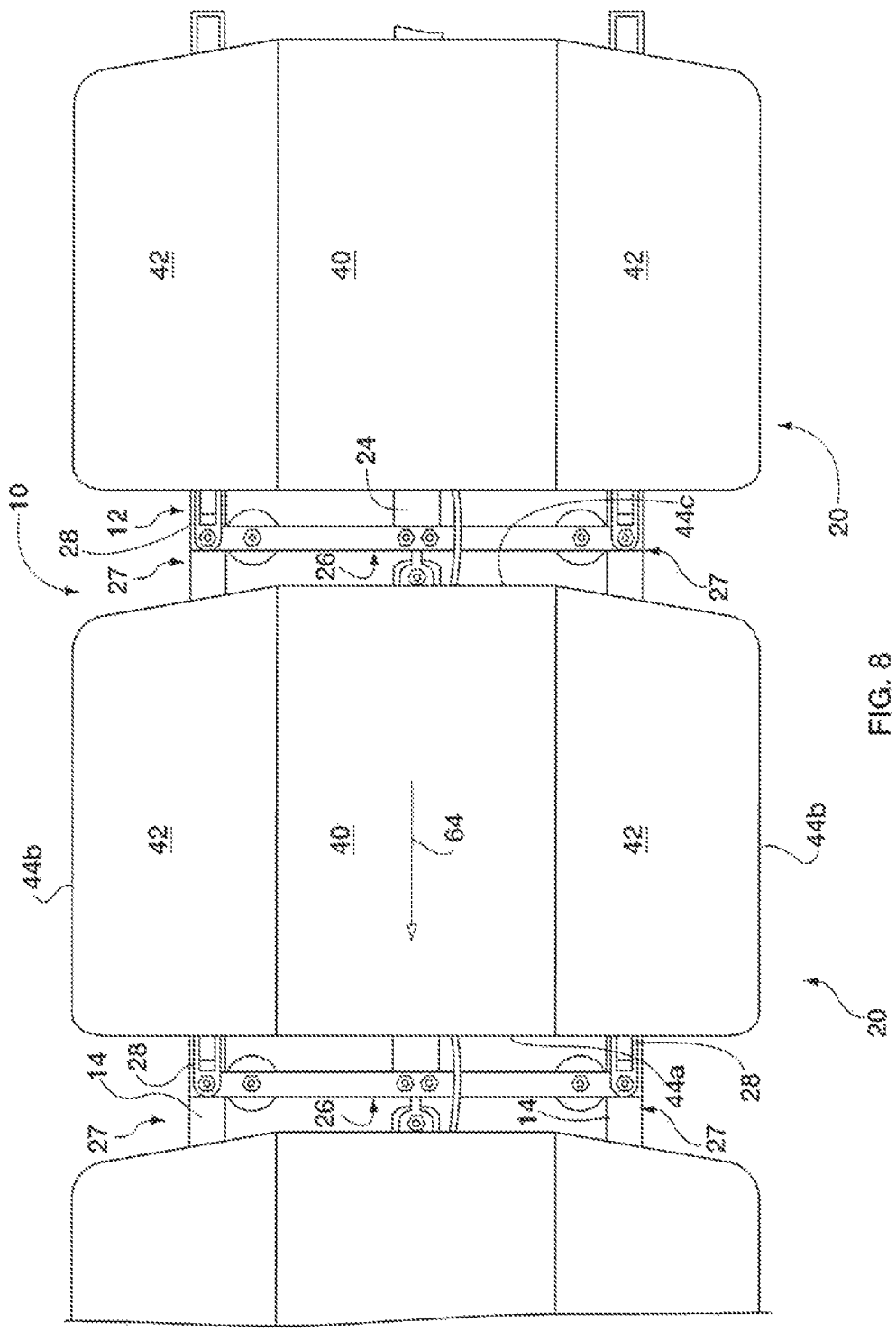

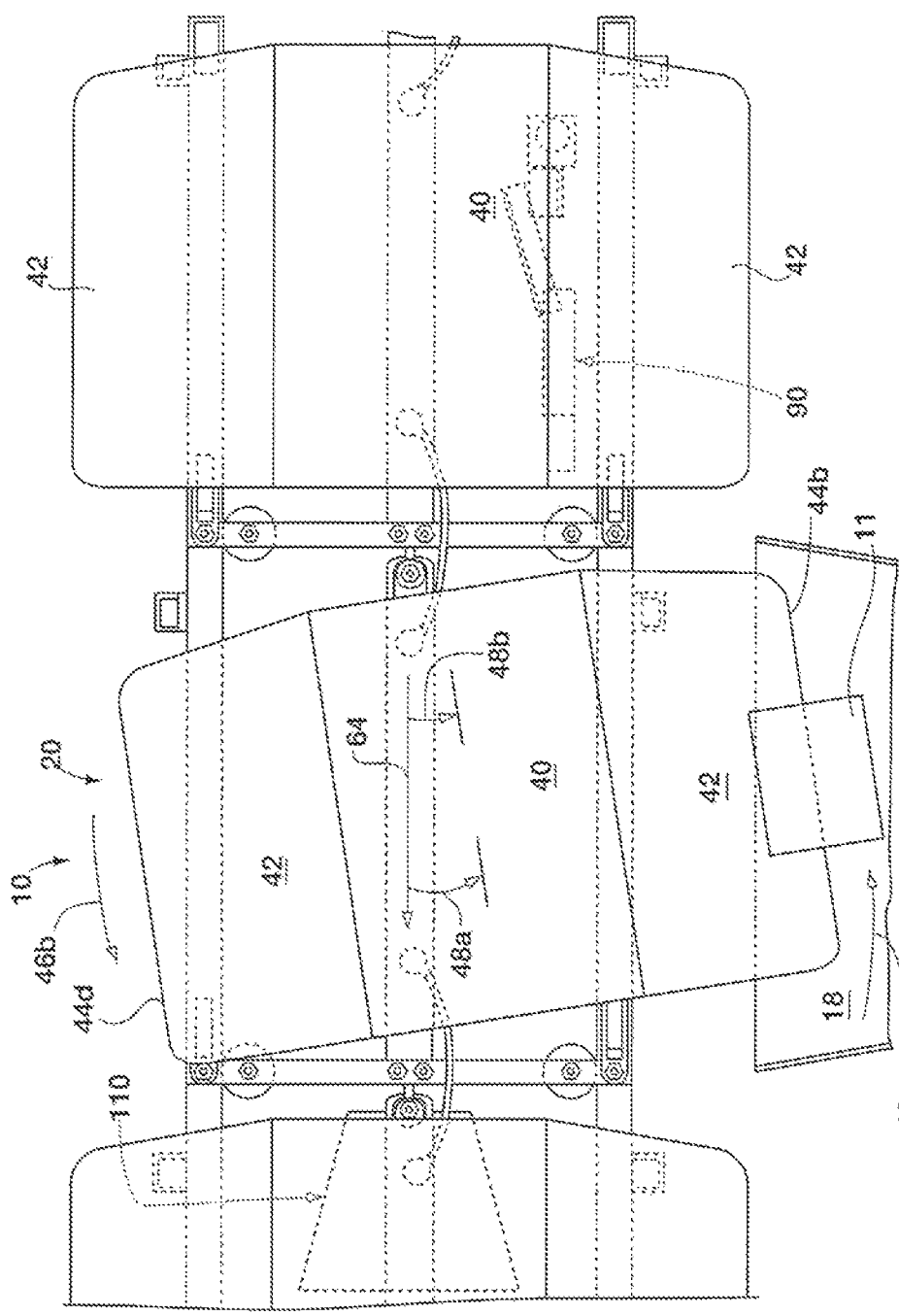

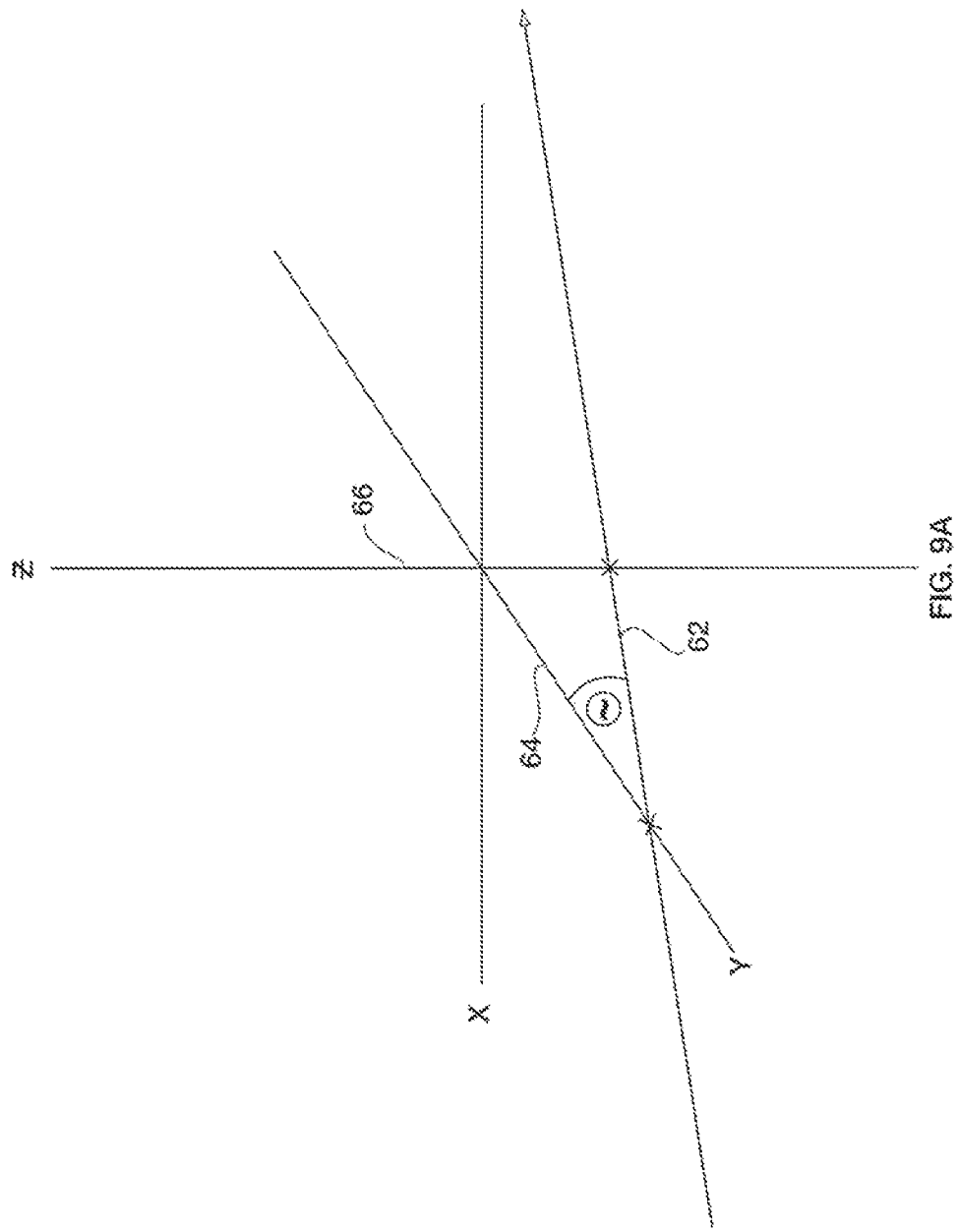

CROSS-BELT SORTATION TRAY

REFERENCE TO PRIOR APPLICATIONS

This application is based on and claims priority from U.S. Provisional patent Application Ser. No. 62/293,995, filed Feb. 11, 2016, which is hereby incorporated by reference.

FIELD

The inventions of the present disclosure relate generally to package sorting conveyors and, more particularly, to a sorting conveyor having a cross-belt sortation tray for unloading objects toward at least one side of the conveyor.

BACKGROUND

Conveyor systems having a number of individual carrying carts have been commonly used for many years to carry and sort packages or other items, such as mail. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are outfeed chutes, or the like, for receiving objects from the carriers. When a carrier holding a particular object reaches a selected outfeed destination, the carrier discharges the object into the outfeed chute or the like.

Conventional systems use electric motors and belts to assist discharging these objects at particular destinations. However, conventional systems present wear, electrical communication, acceleration, deceleration, and mechanical resistance challenges. Additionally, known systems fail to provide convenient installation/maintenance and proper belt tracking.

Thus, Applicant desires a sorting conveyor and cross-belt assembly for transporting objects and unloading objects at one or more unloading stations adjacent the conveyor without the drawbacks and restraints of conventional systems.

SUMMARY

In accordance with the present disclosure, devices and assemblies are provided for transporting objects and unloading objects at one or more unloading stations adjacent the conveyor.

In one embodiment of the disclosure, in a sorting conveyor for transporting objects and unloading objects at one or more unloading stations adjacent the conveyor, a sorting conveyor having a conveyor track and at least one conveyor cart having a frame base for engaging the conveyer track; a sortation tray including a (i) belt roller, (ii) a drive roller substantially parallel to the belt roller, (iii) a timing belt tensioned by the drive roller, and (iv) a removable transport belt aligned between the belt roller and the drive roller and adapted to unload the object toward at least one side of the conveyor; and a support for supporting the sortation tray above the frame base.

In some examples, the sortation tray includes a base support supporting a slider bed. The transport belt may substantially enclose the slider bed in an operating position or the like. The base support may include a front plate. Further, a lower gap filler maybe positioned adjacent to the front plate. The base support may include a rear plate. In addition, an upper gap filler may be positioned adjacent to the rear plate. The sortation tray may include a motor for actuating movement of the transport belt. The sortation tray may include a control board. The apparatus may include a terminal block supporting the control board. In addition, the sortation tray may include a take up roller shoe.

In particular examples, a buss rail powers elements of the sortation tray. For instance, the buss rail may have an interconnect socket assembly and a corresponding interchangeable plug assembly releaseably mating with the socket assembly to power elements of the sortation tray. The socket assembly may include an engagement plate secured about the sortation tray and having at least one alignment aperture and a first connection module. The socket assembly may include a pair of spatially separated apertures on opposing sides of the first connection module. The interchangeable plug assembly may include at least one hook clasp adapted to protrude through the aperture and a second connection module. The plug assembly may include a pair of spatially separated hook clasps on opposing sides of the second connection module. The plug assembly may include at least one pivotal latch adapted to extend and secure the clasp about the aperture. The second connection module may include a mating face configured to interface with a first connection module in an assembled position. In other examples, the buss rail is a contactless buss rail.

In some examples, a tracking mechanism may monitor a distance traveled by the transport belt. Further, rotation of the sortation tray in a first direction unloads the object in a first direction and may energize a subsequent rotation of the sortation tray in an opposing second direction. The sortation tray rotation in the first direction and the second direction may rotate about a common axis of rotation. Further, each conveyor cart may be independently dischargeable from the other trays in a conveyor train.

In another embodiment, in a sorting conveyor for transporting objects and unloading objects at one or more unloading stations adjacent the conveyor, the sorting conveyor comprises a conveyor track; a train of conveyor carts connected end-to-end; and at least one of the conveyor carts including (i) a frame base for engaging the conveyer track, (ii) a carrying tray for holding the objects, (iii) a support for supporting the carrying tray above the frame base, and (iv) a cross-belt assembly for unloading the objects toward at least one substantially perpendicular side of the conveyor.

In some examples, the apparatus includes a drive motor, a driven member attached to the frame base for moving the conveyor carts around the track, and a cantilevered, drive roller connected to one pivot block assembly and another pivot block assembly adapted for positioning the drive roller. A tension link may couple the pivot block assemblies together and movement of each pivot block assembly mirrors movement of the other pivot block assembly. Further, the pivot block assemblies may be coupled together with a self-tensioning adjustment assembly including (i) at least one motor adjustment link affixed to one of the pivot block assemblies, (ii) a second link affixed to the other pivot block assembly, and (iii) a connecting roller link coupling the at least one motor adjustment link and the second link. The frame base includes a lower base portion attached to the conveyor track and the self-tensioning adjustment assembly.

In particular examples, the apparatus includes a contact buss rail adapted to power the cross-belt assembly. The buss rail may have an interconnect socket assembly and a corresponding interchangeable plug assembly adapted to releaseably mate with the socket assembly. The socket assembly may include a pair of spatially separated apertures on opposing sides of a first connection module. The plug assembly may include at least one hook clasp adapted to protrude through the aperture. The plug assembly may include a second connection module. The plug assembly may include at least one latch adapted to secure the clasp about the socket assembly.

In some examples, the movement of the cross-belt assembly in a first direction unloads the object in a first direction and energizes a subsequent movement of the cross-belt assembly in an opposing second direction. Each conveyor cart may be independently dischargeable from the other trays in a conveyor train. The drive roller assembly may include a generally cylindrical roller having an outer elastomeric surface for frictionally engaging the driven member. The elastomeric surface may be a polyurethane. For instance, the polyurethane may have a Shore A hardness between about 70 and about 80.

In particular examples, the motor assembly includes a rotary motor and a drive belt connecting the motor and the drive roller, wherein the drive roller includes a frictional surface for receiving the drive belt. An opposing surface may be adjacent to another surface of the driven member for off-setting the mechanical load of the drive roller in a second drive roller assembly. The second drive roller assembly may further includes a second motor assembly. The driven member of the frame base may include a fin moved in the conveyor line of travel by the opposed roller motor assembly. The opposed roller motor assembly and the fin may be both vertically oriented beneath the trailer frame base. The fin may be generally parallelogram-shaped with rearwardly angled front and rear edges. The apparatus may include a drive motor, a driven member attached to the frame base for moving the conveyor carts around the track, and a cantilevered, drive roller connected to one pivot block assembly and another pivot block assembly adapted for positioning the drive roller. A tension link may couple the pivot block assemblies together and movement of each pivot block assembly mirrors movement of the other pivot block assembly.

In alternative embodiments, conveyor carts may include a frame base for engaging the conveyer track; a carrying tray for holding the objects; and a support for supporting the carrying tray above the frame base. A tilting mechanism including at least one gear having at least one cam is adapted for tilting the carrying tray at least one side of the conveyer. The present inventions may further include a tilt sensor for determining the direction of tilt of the tray. In addition, a drive motor and a driven member attached to the frame base may be included for moving the conveyor carts around the track.

In one embodiment, the tilt sensor includes a direction indicator wherein the direction indicator is configured to sense a reference area on the gear. The tilt sensor may be a dual sensor for carts tipping to more than one side of the conveyor.

In one embodiment, the tilt sensor may include a positioning indicator wherein the positioning indicator is configured to sense a reference area on the at least one gear. The positioning indicator may be a dual sensor for carts tipping to more than one side of the conveyor.

In the tilting mechanism, the at least one cam is rotatable around an axis of rotation of the at least one gear between about 0 degrees and about 360 degrees. In one embodiment, the at least one cam travels between about 0 degrees and about 140 degrees around the axis of rotation. In one embodiment, the cam moves toward about 0 degrees in response to the tilt sensor. In operation, rotation of the at least one cam in a first direction around an axis of rotation of the at least one gear tilts the tray in a direction toward one side of the conveyer.

The tilting mechanism may also include a second gear having a second cam. Each cam movement may respond to the tilt sensor and whereby the tilt sensor may monitor a reference area on the gears. In operation, at least one cam actuates the tray toward a neutral position when the tilt sensor determines a not home signal on at least one the gear.

In one embodiment, the support is a tiltable support having an incremental tilting response to rotation of the first and second cams about an axis of rotation. The tiltable support may include at least one camway for housing the first cam and the second cam. In one embodiment, the cams are rotatable substantially between about 0 degrees and about 25 degrees about an axis of rotation of each gear respectively. Also, in one embodiment, one of the cams may be housed within a camway within the tiltable support and the other cam may be outside of the camway within the tiltable support when the cams are rotated substantially between about 25 degrees and about 135 degrees about an axis of rotation of each gear respectively. In operation, the tiltable support tilts between about 40 degrees and about 50 degrees around the axis of tilt when the first cam and the second cam are rotated between about 120 degrees and about 140 degrees around the axis of rotation of each gear respectively.

In one embodiment, the axis of rotation of the first gear and the second gear is between about 0 degrees and about 360 degrees. In one embodiment, the first cam and the second cam may travel between about 0 degrees and 140 degrees around the respective axis of rotation. In one embodiment, the first cam rotates about between 0 and 140 degrees around the axis of rotation of the first gear and the second cam rotates about between 0 and 140 degrees around the axis of rotation of the second gear. In operation, rotation of the first cam in a first direction around an axis of rotation tilts the tray in a direction toward one side of the conveyer and wherein rotation of the second cam in a second direction around an axis of rotation tilts the tray toward an opposite side of the conveyer than the one side.

In one embodiment, the first cam and the second cam each rotate about an independent axis of rotation. In operation, rotation of the cams in a clockwise or counterclockwise direction is opposite the tilt of the tilt tray in a clockwise or counterclockwise direction.

The conveyor cart may further include at least one drive for actuating the tilting mechanism. In one embodiment, the drive is a gear drive for interacting with at least the first gear. Also, the tilting mechanism may be adapted so that each tray is independently dischargeable from the other trays in the conveyor train.

In one embodiment, the drive motor for moving the conveyor carts around the track may further include an opposed roller motor assembly for moving the conveyor carts on the conveyor track, the opposed roller motor assembly including a cantilevered, drive roller connected to one pivot block assembly and another pivot block assembly adapted for positioning the drive roller, wherein the pivot block assemblies are coupled together and adapted so that movement of each pivot block assembly mirrors movement of the other pivot block assembly. Also, the pivot block assemblies may be coupled together with a self-tensioning adjustment assembly including (i) at least one motor adjustment link affixed to one of the pivot block assemblies, (ii) a second link affixed to the other pivot block assembly, and (iii) a connecting roller link coupling the at least one motor adjustment link and the second link.

In one embodiment, the frame base may include a lower base portion attached to the conveyor track and the self-tensioning adjustment assembly. Also, the self-tensioning adjustment assembly may include a drive clamp plate connected to the lower base portion. In one embodiment, a lever may be connected to the self-tensioning adjustment assembly and adapted to adjust the pivot block assemblies. In one embodiment, the lever is adapted so that movement of each pivot block assembly mirrors movement of the other pivot block assembly.

Also, in one embodiment, the self-tensioning adjustment assembly includes a self-tensioning clamp plate for supporting the lever. The self-tensioning clamp plate may include a mounting bracket connecting a proximate end of the lever to the self-tensioning clamp plate. Also, the self-tensioning assembly may include a lever retainer affixed to the self-tensioning clamp plate to retain a distal handling end of the lever in an operating position. The self-tensioning assembly also may include a coupling arm connecting the lever and the connecting roller link. The self-tensioning assembly may further include a spring assembly between the coupling aim and the connecting roller link.

In one embodiment, the second link is a motor adjustment link.

In one embodiment, the drive roller assembly includes a generally cylindrical roller having an outer elastomeric surface for frictionally engaging the driven member extended fin. The elastomeric surface may be a polyurethane. In one embodiment, the polyurethane has a Shore A hardness between about 70 and about 80.

In one embodiment, the motor assembly includes a rotary motor and a drive belt connecting the motor and the drive roller, wherein the drive roller includes a frictional surface for receiving the drive belt. Also, in one embodiment, an opposing surface is adjacent to another surface of the driven member for off-setting the mechanical load of the drive roller in a second drive roller assembly. The second drive roller assembly may further include a second motor assembly.

In one embodiment, the driven member of the frame base comprises a fin moved in the conveyor line of travel by the opposed roller motor assembly. The opposed roller motor assembly and the fin may both be vertically oriented beneath the trailer frame base. In one embodiment, the fin is generally parallelogram-shaped with rearwardly angled front and rear edges.

Accordingly, in some embodiments a sorting conveyor for transporting objects and unloading objects at one or more unloading stations adjacent the conveyor, the sorting conveyor comprising: (a) a conveyor track; (b) a train of conveyor carts connected end-to-end; and (c) at least one of the conveyor carts including (i) a frame base for engaging the conveyer track; (ii) a carrying tray for holding the objects; (iii) a support for supporting the carrying tray above the frame base; and (iv) a tilting mechanism including at least one gear having at least one cam for tilting the carrying tray toward at least one side of the conveyor.

In other embodiments of the present inventions, a sorting conveyor for transporting objects and unloading objects at one or more unloading stations adjacent the conveyor, the sorting conveyor having a conveyor track and a train of conveyor carts connected end-to-end, at least one of the conveyor carts comprising: (a) a frame base for engaging the conveyer track; (b) a carrying tray for holding the objects; (c) a support for supporting the carrying tray above the frame base; (d) a tilting mechanism including at least one gear having at least one cam for tilting the carrying tray toward at least one side of the conveyor; and (e) a tilt sensor for determining the direction of tilt of the tray.

Still other embodiments of the present inventions include a sorting conveyor for transporting objects and unloading objects at one or more unloading stations adjacent the conveyor, the sorting conveyor comprising: (a) a conveyor track; (b) a train of conveyor carts connected end-to-end; (c) at least one of the conveyor carts including (i) a frame base for engaging the conveyer track; (ii) a carrying tray for holding the objects; (iii) a support for supporting the carrying tray above the frame base; (iv) a tilting mechanism including at least one gear having at least one cam for tilting the carrying tray toward at least one side of the conveyor; and (vi) a tilt sensor for determining the direction of tilt of the tray; and (d) a drive motor and a driven member attached to the frame base for moving the conveyor carts around the track.

These and other aspects of the present invention will become apparent to those skilled in the art after a reading of the following description of the preferred embodiment when considered with the drawings.

BRIEF DESCRIPTION OF THE DRAWINGS

Embodiments of the disclosure will be better understood by a reading of the Description of Embodiments along with a review of the drawings, in which:

FIG. 8 is a top view of the train of carts of one embodiment of the sorting conveyor of the present inventions;

FIG. 8A shows the train of carts of FIG. 8, but with one of the carts in its tilted position and unloading a package onto an unloading station beside the sorting conveyor track;

FIG. 9A is a geometric depiction of one embodiment of the conveyor cart pivot axis and conveyor line of travel as they relate to three-dimensional X,Y,Z spatial coordinates;

DETAILED DESCRIPTION OF EMBODIMENTS

Figure 1:
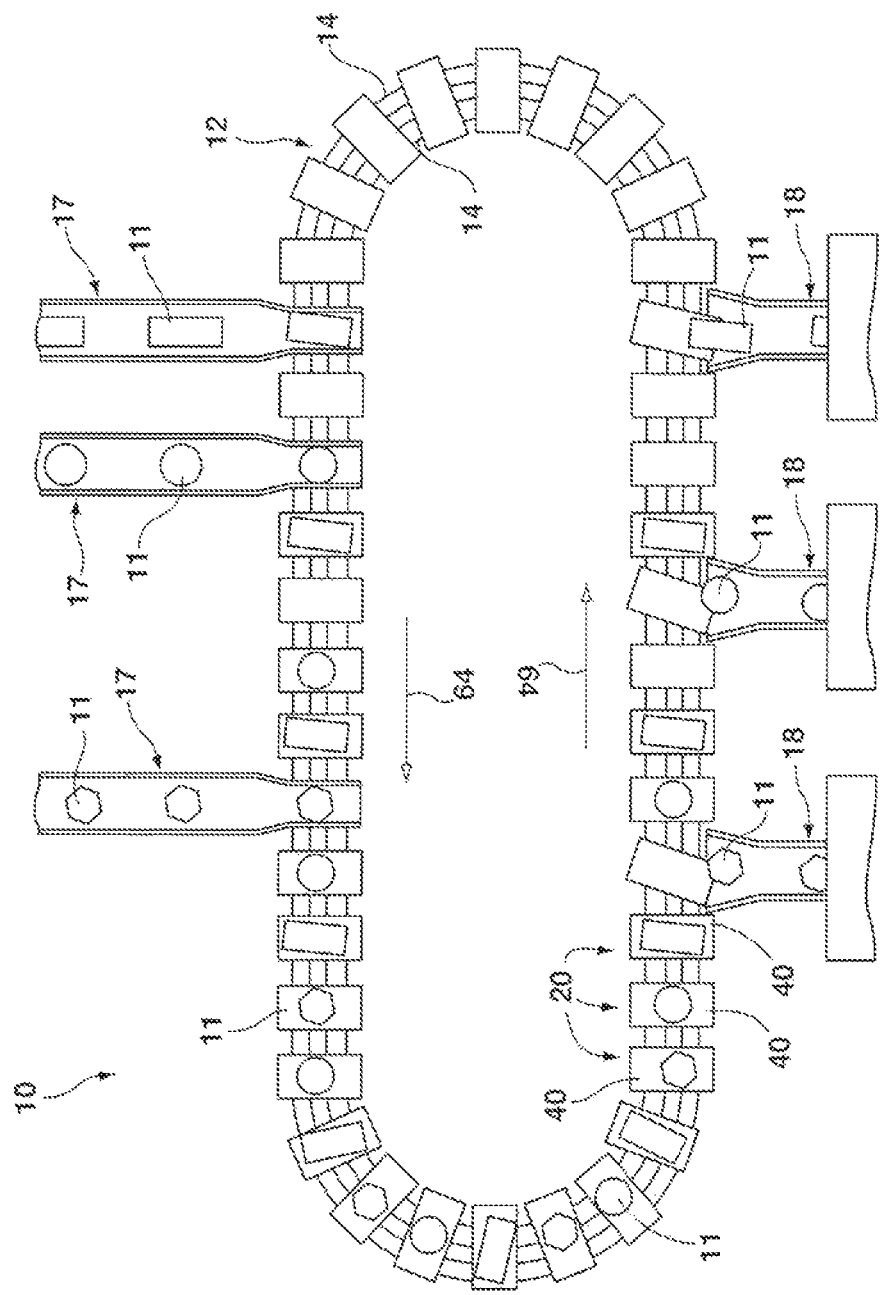
FIG. 1 is a schematic depiction of one embodiment of a package sorting conveyor constructed according to the present disclosure.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 2A:
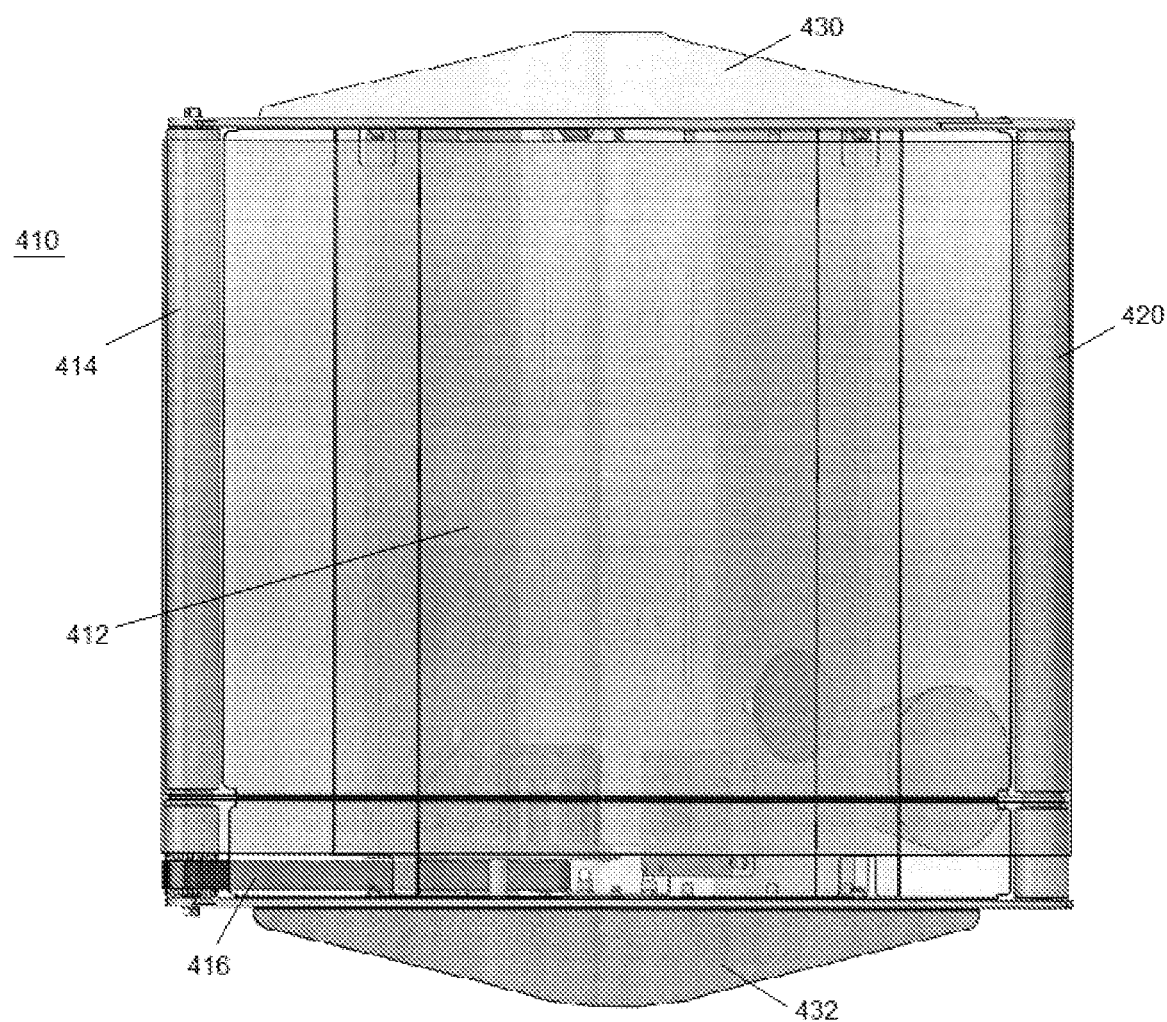
FIG. 2A is a top perspective view of a sortation tray according to one embodiment of the disclosure, with elements omitted for clarity.
Figure 2B:
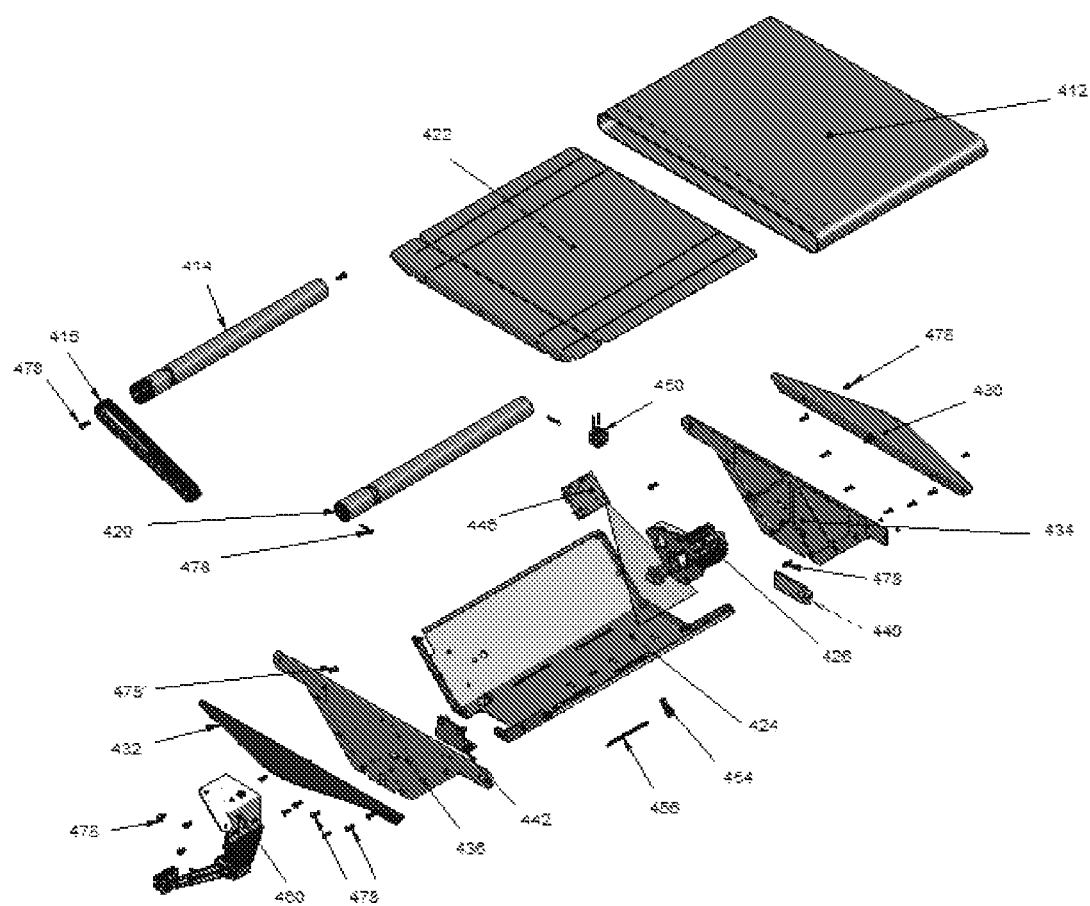
FIG. 2B is an exploded perspective view of the embodiment introduced in FIG. 2A.
Figure 2C:
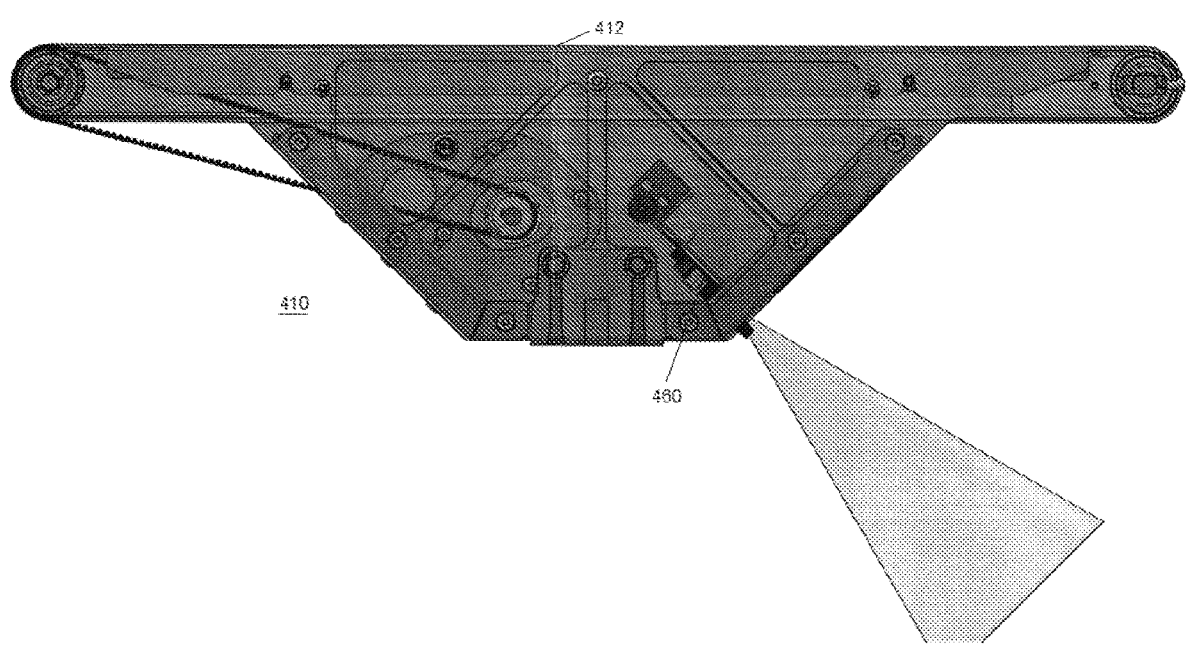
FIG. 2C is a side view of the embodiment introduced in FIG. 2A.
Figure 4A:
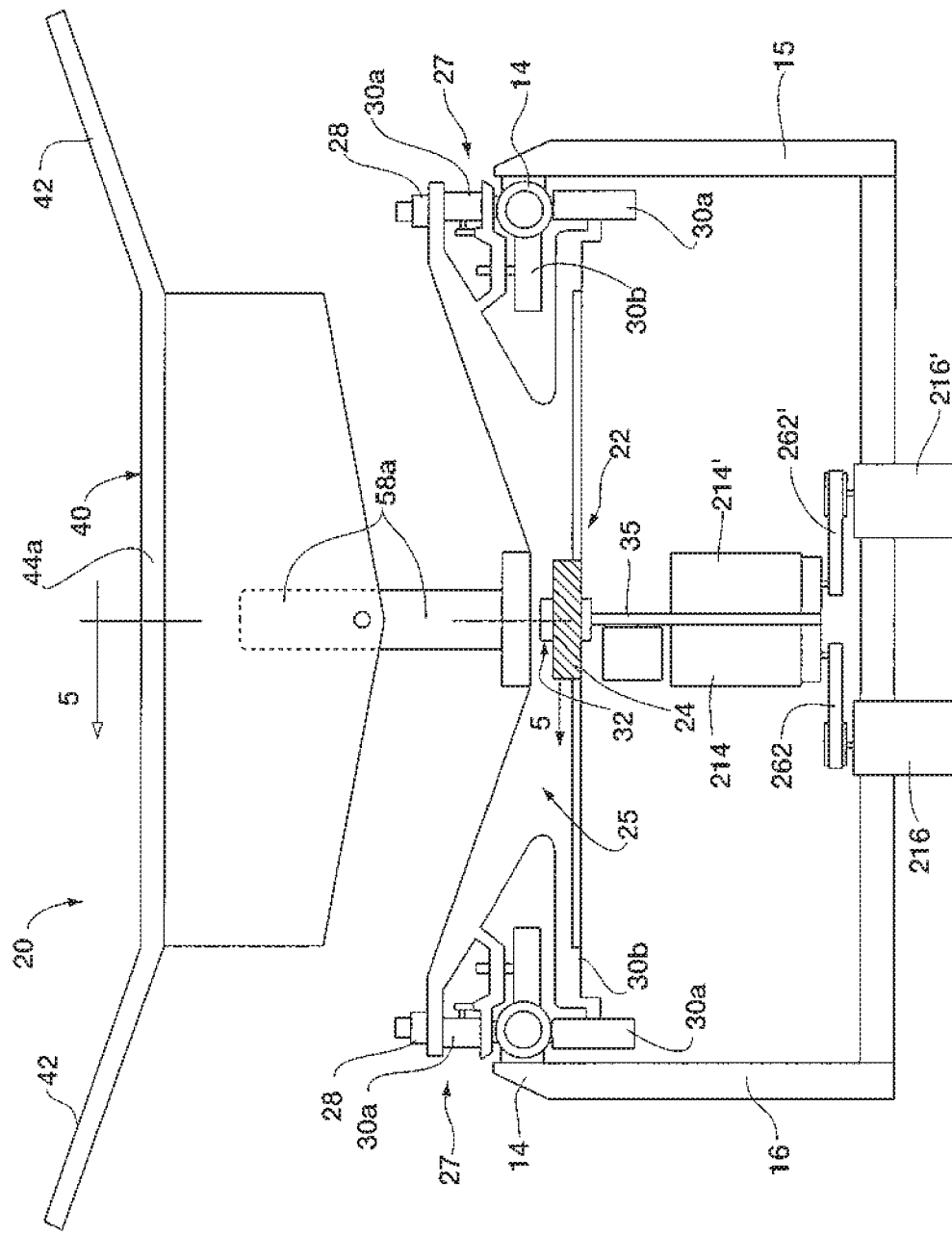
FIG. 4A is front elevational view of a single tilting conveyor cart of a package sorting conveyor and an opposed roller motor assembly of the conveyor.

Referring now to the drawings in general and FIGS. 1, 2B, and 4A in particular, it will be understood that the illustrations are for the purpose of describing embodiments of the inventions and are not intended to limit the inventions thereto. As best seen in FIG. 1, a sorting conveyor, generally designated 10, is shown constructed according to the present disclosure for transporting and sorting objects 11 or other packages. The sorting conveyor 10 comprises a train of individual carts 20, connected end to end, which may form an endless loop around a closed-circuit conveyor track 12. Alternately, the conveyor carts 20 of the inventions could be used singly or as part of a finite train. The conveyor cart 20 typically includes a sortation tray for unloading objects adjacent the conveyor, including at a first direction and at a second opposing direction.

The sorting conveyor 10 generally includes a conveyor track 12 and the conveyor carts 20 that are generally moved around the track by one or more drive motors (not shown in FIG. 1). Each of the conveyor carts typically includes a frame base 22 for engaging the conveyer track; a carrying tray 40 for holding the objects and/or a sortation tray; a support 58a for supporting the carrying tray above the frame base. Typically, there are any number of unloading locations which are adjacent the package sorting conveyor 10 on one or both sides thereof, to receive the objects 11 discharged from the sorting conveyor 10. Objects may be loaded on the sorting conveyor 10 in a variety of ways as recognized by one skilled in the art having the benefit of this disclosure, including, but not limited to, infeed chutes 17, manually delivery, or the like.

The conveyor track 12 includes two parallel rails 14 and may be built to conform to the layout of any mass transit terminal, distribution center, warehouse, shipping center, or the like. Best seen as resembling the track of a roller coaster, the conveyor track 12 may be substantially horizontal or may ascend and descend. The conveyor track rails 14 may lie in the same horizontal plane, or one may be higher than the other, such as would be the case in a banked curve in the track 12. Banked curves in some circumstances may be advantageous because they allow the conveyor carts 20 to move around a curved conveyor track 12 at a much greater speed without spilling objects 11 than on a flat track. Typically, the rails 14 are generally tubular, again similar to a roller coaster, and are supported by rail support members 16 only on the outwardly facing edges of the rails. The rails 14 may typically be round, however, may also be rectangular or take on other shapes in cross-section. Each cart 20 may be built around the trailer frame base 22 to which other components of each cart 20 are mounted. As shown in FIGS. 4A and 4C, the trailer frame structure 22 may include a longitudinal base member 24 that extends in the rearward direction of conveyor travel 64 between the two parallel rails 14. Preferably, the base member 24 is substantially equidistant from each rail 14.

A roller structure 26 for riding on the conveyor track 12 is mounted on a front end of the base member 24 and may include two laterally extending cam follower mechanisms 27, one for each rail 14. The reason for the outboard placement of the rail supports 16 and the tubular shape of the rails 14 becomes apparent upon examining the cam follower mechanisms 27. Each cam follower mechanism 27 may include three cam followers: an upper cam follower 30a for riding on the top edge of the rail 14, a middle cam follower 30b for riding on an inside edge of the rail 14, and a lower cam follower 30c for riding on the bottom edge of the rail 14. With this configuration, it is almost impossible for a cart 20 to jump the track 12, because a wheel is provided for each directional force (sideways, upward and downward) that a cart 20 may encounter when traveling along the track 12. Preferably, each cam follower 30a, 30b and 30c is constructed of a somewhat resilient material such as polyurethane to provide for smooth, quiet, relatively vibration-free operation of the sorter conveyor 10.

The structure of one embodiment of each cam follower mechanism 27 that holds the top wheel 30a is shown in greater detail in U.S. Pat. No. 5,836,436, which is herein incorporated by reference in its entirety. Each top cam follower 30a is retained by an axle caster 28 that is preferably formed from extruded aluminum or the like. The axle caster 28 includes two forks, one on each side of the wheel 30a, and a bearing bore disposed at the juncture of the two forks which has an opening on one side so that the bearing bore communicates with the space between the forks. A pair of flange bearings seated in the bearing bore are disposed around an axle shaft extending from the roller structure 26. Preferably formed of an Oilite® metal alloy or other friction-reducing material, each flange bearing has the form of a top-hat bushing and includes a center hole through which passes the axle shaft. The cam follower 30a is held in place between the two forks by a bolt and nut. Preferably, the cam follower 30a includes a bearing structure disposed around the bolt, which serves as an axle running through the center of the wheel 30a.

The axle caster 28 of the present disclosure provides that the flange bearings can easily be slid into place by hand into the bearing bore 28 without using a press. Then, to immovably secure the flange bearings inside the bearing bore, the forks are slightly flexed inwardly towards each other as the nut is tightened onto the bolt to hold the wheel 30a in place. The forks of the axle caster are therefore formed minutely wider apart than would be necessary to merely hold the wheel 30a. When the forks are flexed inwardly towards each other by tightening the nut on the bolt, the opening of the bearing bore is closed somewhat and the bearing bore is itself slightly distorted, securely retaining the flange bearings therein. The flange bearings themselves are, however, not significantly distorted and are free to swivel back and forth on the axle shaft. Therefore, the flange bearings can easily and immediately be replaced on-site when worn, eliminating much down-time that would be required if conventionally designed axle casters were used in the conveyor cart 20 of the present invention.

Adjacent carts 20 in the train may be connected together using hitch mechanisms 32. Each hitch mechanism 32 as including a front hitch mounted on the front end of the base member 24 in front of the roller structure 26 and a rear hitch mounted on the rear end of the base member. In one embodiment, each hitch 32 has a vertical throughbore, through which a hitch pin connector is inserted. The hitch mechanisms 32 may be configured so that the front hitch on a rearward cart is disposed overtop of the rear hitch on a forward cart. In the alternative, the hitch mechanisms 32 may comprise a poly-directional spherical ball joint mechanism similar in structure to an automotive trailer hitch. In either case, friction between hitch mechanism components is preferably reduced by, for example, lining the hitch components with TEFLON® polymer or other relatively low-friction material.

To prevent adjacent conveyor carts 20 from separating should the hitch mechanism 32 accidentally break or become uncoupled, an auxiliary cart connector 34 is preferably connected between the trailer frame structures 22 of adjacent carts 20. The auxiliary cart connector 34 may be a metal cable or lanyard, although other high-tensile strength materials could be used. In the embodiment depicted, the auxiliary cart connector 34 is an approximately 3/16th inch thick metal cable connected to adjacent trailer frame structures 22 with metal mounting connectors 34a.

The primary reason that metal is the preferred material for the auxiliary cart connector 34, besides its strength, is so that the auxiliary cart connector 34 will also serve as a continuous electrical connector between adjacent carts 20. Electrical continuity between carts 20 is important because of static electricity build-up while the carts 20 are traveling around the conveyor track 12. However, because the cam followers 30a, 30b and 30c are preferably formed of polyurethane (an electrical insulator) and because the components of the hitch mechanism 32 are preferably coated with TEFLON® polymer (also an electrical insulator), electrical continuity between adjacent carts 20 may not otherwise be effectively achieved. By electrically connecting the carts 20, static charges can be bled off from the train, for safety and operational considerations. Thus, the auxiliary cart connector 34 serves two purposes: first, it physically attaches two adjacent conveyor carts 20 and prevents them from becoming completely separated should the hitch mechanism 32 fail; second, it enables electrical continuity among all of the conveyor carts 20 in the train.

Even without the auxiliary connector cable 34, only the rear end of the trailer frame structure 22 will drop below the conveyor track 12 upon accidental disengagement of the hitches or upon breakage of the hitch mechanism 32. Therefore, instead of the front end 36a of the driven fin 36 digging into the floor sides or underlying structures below the conveyor, as is the case with prior art conveyors, the driven fin 36 will simply be dragged with relatively minimal damage should one of the hitches 32 break or become accidentally uncoupled. If an auxiliary connector cable 34 is attached between two adjacent carts 20 that break apart, the connector cable 34 will limit the distance that the rear end of the trailer frame structure 22 will drop, further limiting damage.

Mounted atop the trailer frame base 22 of each conveyor cart 20 is the support 58a, which supports the carrying tray 40 thereabove. There may be one or more supports 58a.

As illustrated in FIGS. 2A and 2B, the conveyor cart 20 may include a sortation tray for unloading objects at one or more unloading locations adjacent the conveyor. For instance, at mass transit terminals, conveying systems, or the like, the sortation tray may unload objects at a first direction or at a second opposing direction. The cross belt assembly 410 of the sortation tray shown includes a base support 424 supporting a slider bed 422. A front end of the base support 424 may include a front plate 434, while the rear end of the base support 424 may include a rear plate 436 to allow the sortation tray to travel at inclines, declines, banks, curves, as shown and described herein.

Figure 2D:
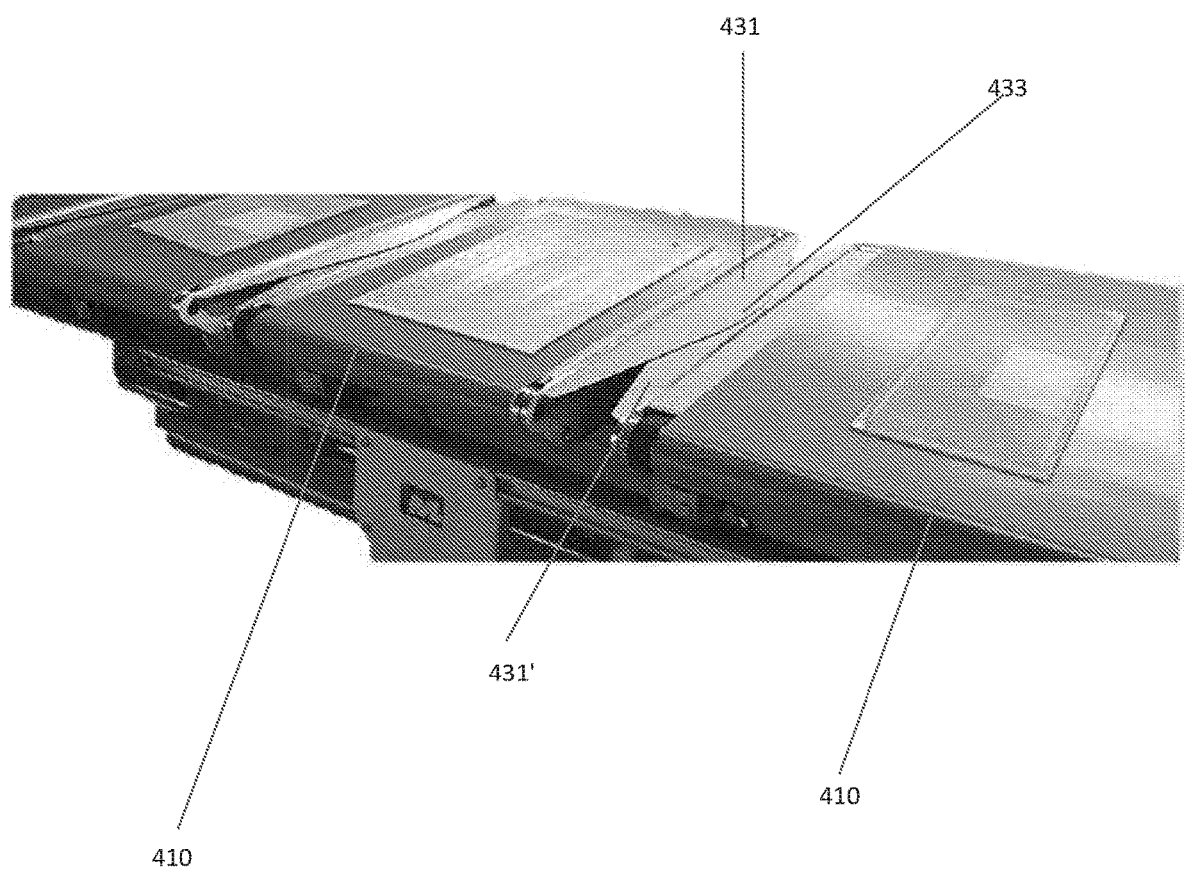
FIG. 2D is a side perspective view of one embodiment of a tray gap filler according to one example of a package sorting conveyor.

The sortation tray may include one or more (tray) gap fillers to provide a substantially planar traversing barrier between the upper surface of cart 20 and lower components during any of the actuation or movement about any travel configuration shown and described herein. For instance, as illustrated in FIG. 2B a lower gap filler 430 may be aligned with the front plate 434 for translating movement in at least one direction to coincide with a traversing adjacent surface. Similarly, an upper gap filler 432 may be aligned with rear plate 436 for translating movement in at least one direction to coincide with a traversing adjacent surface. The lower gap filler 430 and/or upper gap filler 432 may extend and retract to mate the spacing of the cart 20 along a particular movement. Any of the gap fillers, including the upper gap filler and/or the lower gap filler, may comprise less rigid material, including fabric, belt, plastic, and the like, to support any of the travel configurations shown and described herein. FIG. 2D shows one example of a tray gap filler including a first filler portion 431 and a second filler portion 431'. The first filler portion 431 may be an upper gap filler 432 and the second filler portion 431' may be a lower gap filler 430, and/or vice versa. The first filler portion 431 and the second filler portion 431' may extend toward one another and free floating, at least across the gap formed between two trays. The first filer portion 431 and second filler portion 431' may interface to cover at least a portion of the gap. The first and second filler portions 431, 431' may each include an apex 433. The apex 433 of the filler portions may overlap to cover at least a portion of the gap. The overlap area may be greater at a medial part of the tray gap filler. A portion of the gap may remain uncovered by the tray gap filler. The uncovered area may be at a distal part of the gap on one or both sides. The tray gap filler may alternate between a first position where the apex of the first filler portion 431 and second filler portion 431' overlap at the medial part while a gap is maintained at the more distal ends of the gap and a second position where, for example in a curved portion of the track, the overlap of the first filler portion 431 and second filler portion 431' extend to at least one of the more distal ends of the gap.

Further, a take up roller shoe 440 may be positioned at the front end of the base support 424. As shown in FIG. 2B, each cart may include a motor 426 to generally drive the sortation tray and may be positioned at the front end of base support 424. The base support 424 may additionally support a fuse holder that encloses a fuse 454, for instance a time delay ceramic fuse or the like, and a control board 446 to communicate with instrumentation to provide any of the movements shown and described herein. A cap plug 456 may be aligned about base support 424 as seen in FIG. 2B.

As shown in FIG. 2B, a removable transport belt 412 encloses slider bed 422 to discharge objects from the conveyor track 12. As shown in FIG. 2A, the drive roller 414 is generally parallel to the belt roller 420. The timing belt 416 is tensioned by drive roller 414. Unexpectantly, the Applicants have discovered that when the transport belt 412 is installed, or replaced during maintenance, the drive roller 414 tensions the timing belt 416 to significantly reduce down time.

A variety of buss rail arrangements may provide electrical power to the sortation tray, including contactless electrical systems and contact electrical systems as understood by those skilled in the art having the benefit of this disclosure.

Figure 3A:
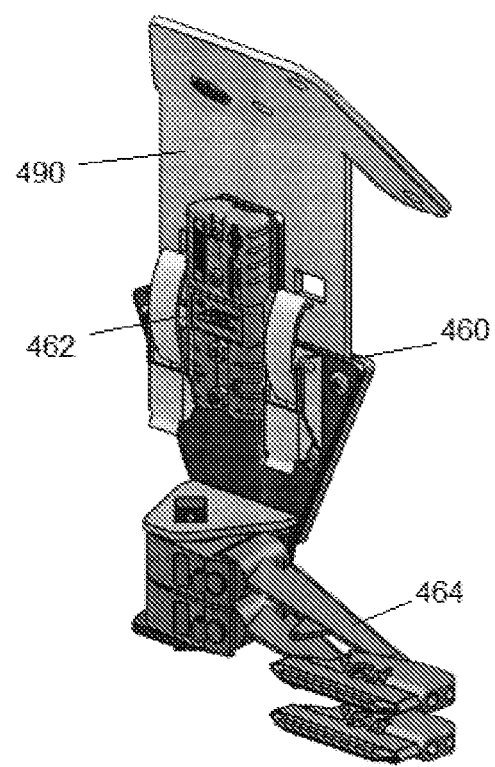
FIG. 3A is a side perspective view of an isolated buss rail embodiment introduced in FIG. 2B.
Figure 3B:
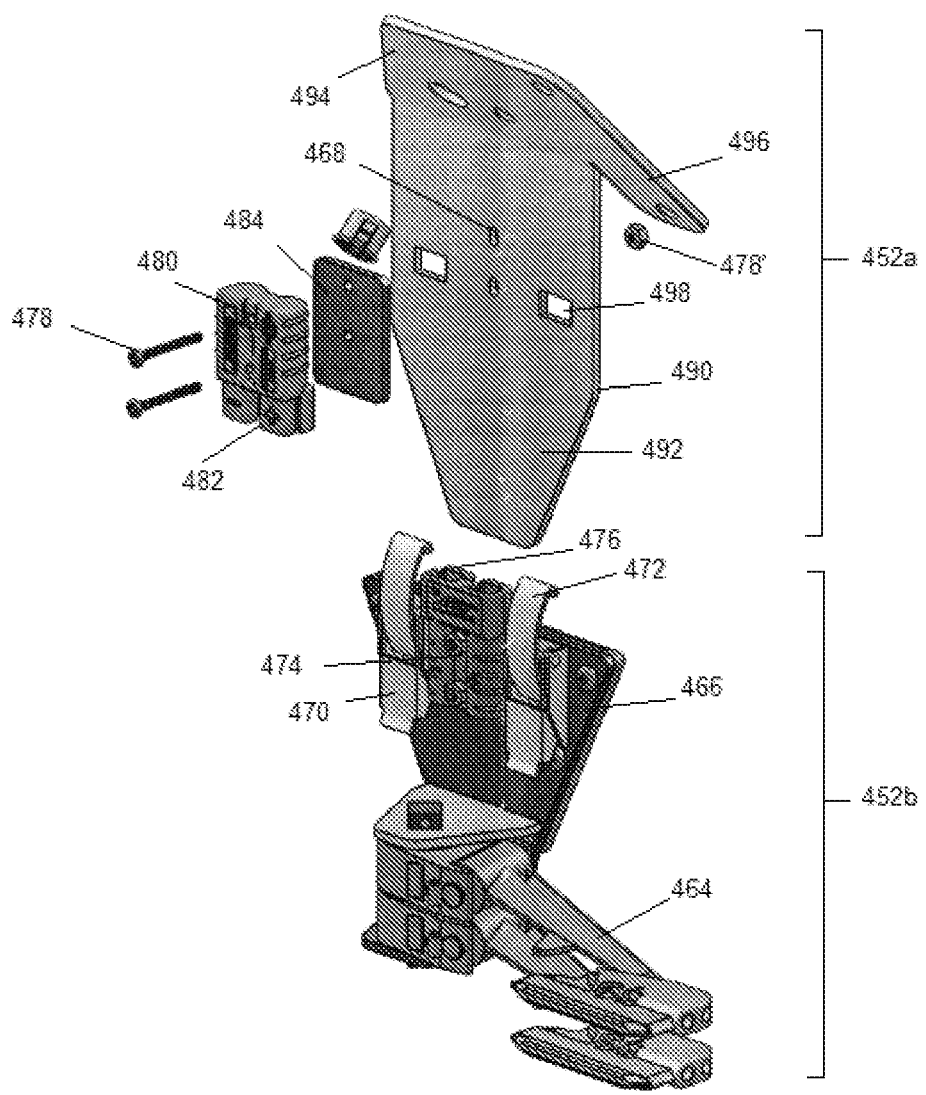
FIG. 3B is an exploded perspective view of the buss rail embodiment shown in FIG. 3A.

FIGS. 3A and 3B illustrate one embodiment of a quick-connect, interchangeable buss rail contact system 464 to provide electrical power to the sortation tray. The contact buss rail may include an interconnect socket assembly 452a having an engagement plate 490 generally secured about the sortation tray. FIG. 3B shows one example of the engagement plate 490 having a first portion 492, an offset second portion 494, and a neck portion 496 to mate with corresponding surfaces of the sortation tray shown and described herein. The socket assembly 452a includes at least one alignment aperture to receive a corresponding plug assembly component in a coupled position. And in particular examples, the socket assembly 452a may have a pair of spatially separated apertures 498 on opposing sides of a first connection module 480. The first connection module 480 may be any electrical connection to power the sortation tray when engaged with a second connection module 474. A spacer 484 may be aligned between the first connection module 480 and engagement plate 490. A corresponding interchangeable plug assembly 452b releaseably mates with socket assembly 452a. The plug assembly 452b includes a clasp 472 to protrude through aperture 498. As shown in FIG. 3B, one example of the plug assembly 452b includes pair of spatially separated hook clasps 472 on opposing sides of a second connection module 474. In certain examples, a pivotal latch 470 extends and secures hook clasps 472 about apertures 498.

Figure 4B:
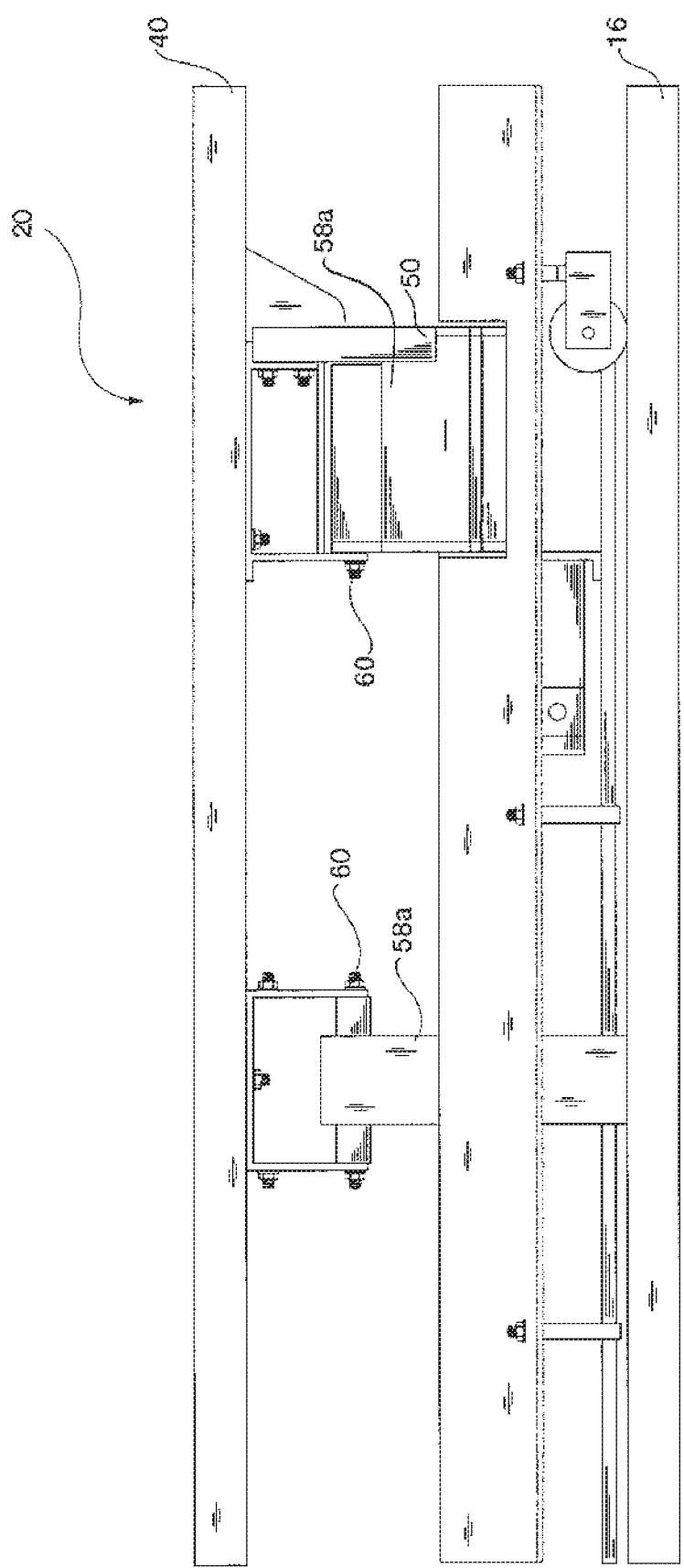
FIG. 4B is a side view of one embodiment of the tilting conveyor cart shown in FIG. 4A, which also shows the tiltable support apparatus of the tilting conveyor cart of the inventions.
Figure 4C:
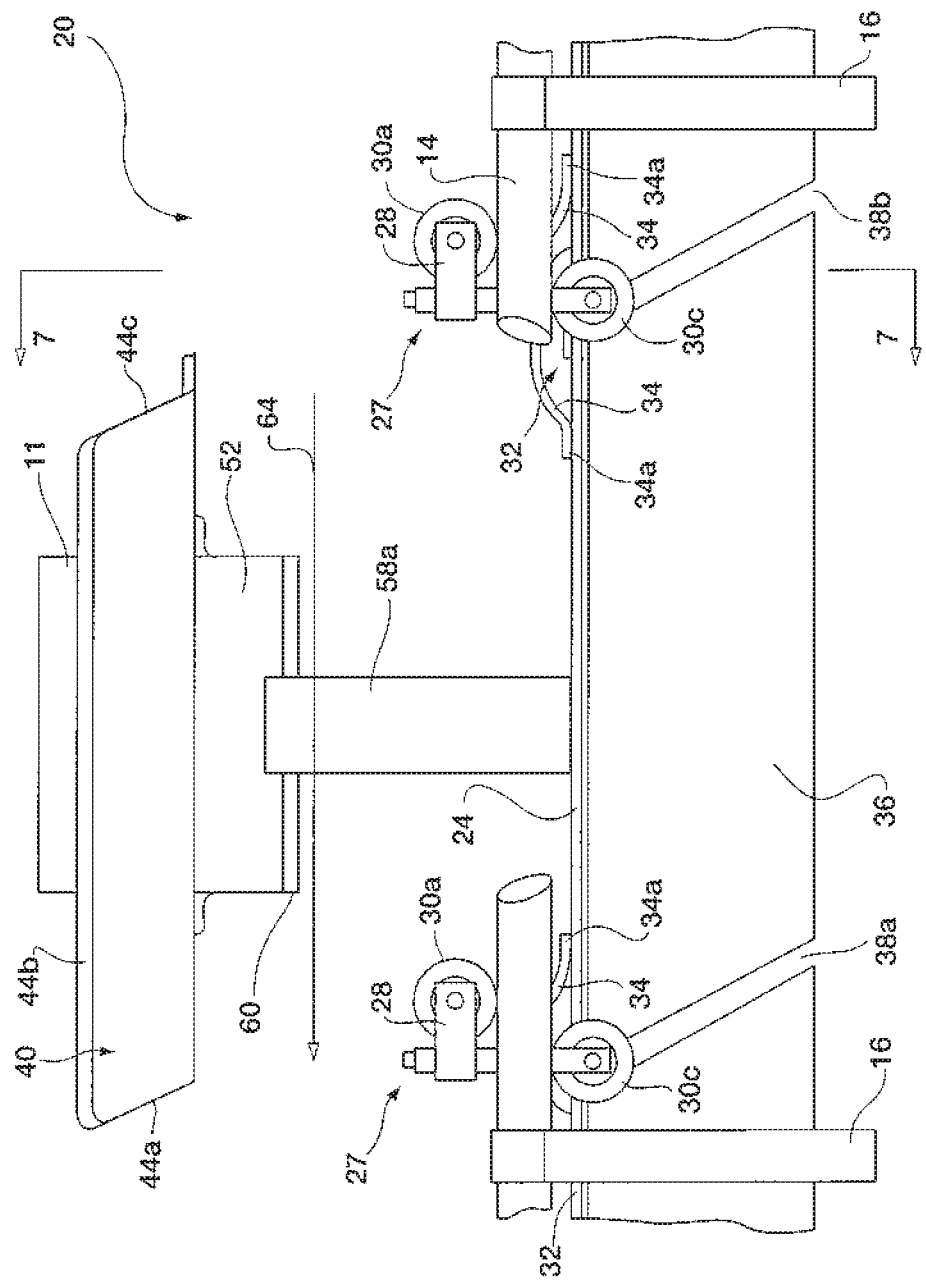
FIG. 4C is a side view of one embodiment of the tilting conveyor cart shown in FIG. 4A.

In one embodiment, as best seen in FIGS. 4A and 4B, the support structure 58a may be a generally planar member that lies in the vertical plane parallel to the conveyor line of travel 64. In one example, the support may include a pivot structure 60 and/or could take on the form of a hinge structure joining together two generally planar support structures, one 52 attached to the tray 40, and one 58a extending from the frame base 22.

As can be seen in the drawings, the tray 40 may be planar or may also include upwardly angled lateral wings 42 to help prevent packages 11 from accidentally falling off the tray 40. These wings 42 also decrease the angle of the slope created when the tray 40 is tilted, which helps with gentle handling of the packages 11 as they are discharged from the cart 20.

When a carrying tray 40 reaches a particular destination unloading station 18, the tilting mechanism 50 tilts the carrying tray 40 to cause a package 11 carried thereon to be discharged into the unloading station 18. A tilting mechanism 50 is generally mounted on each conveyor cart 20.

Figure 5A:
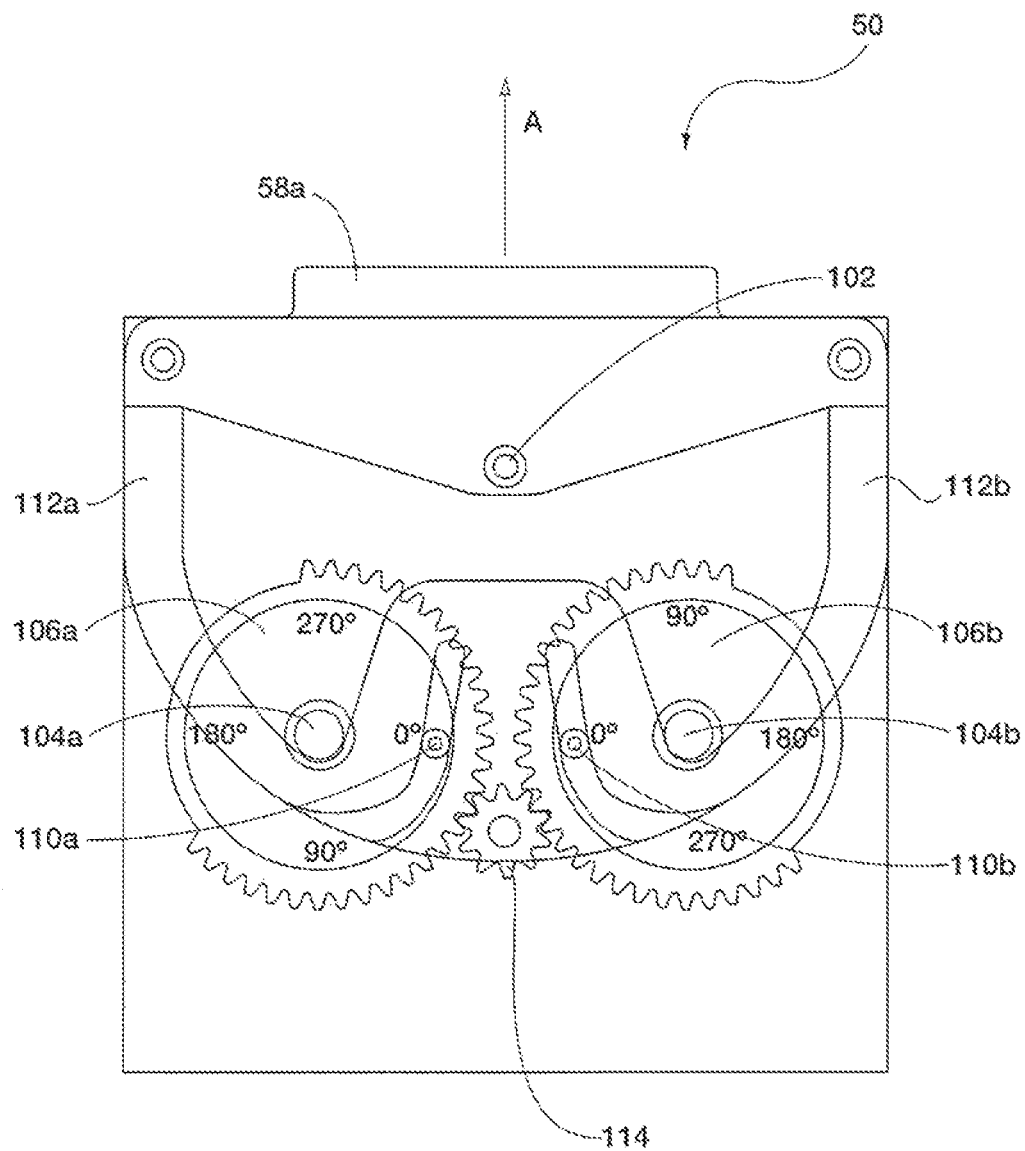
FIGS. 5A-5E show a tilting mechanism in different positions as the carrying tray tilts toward at least one side of the conveyor.
Figure 5B:
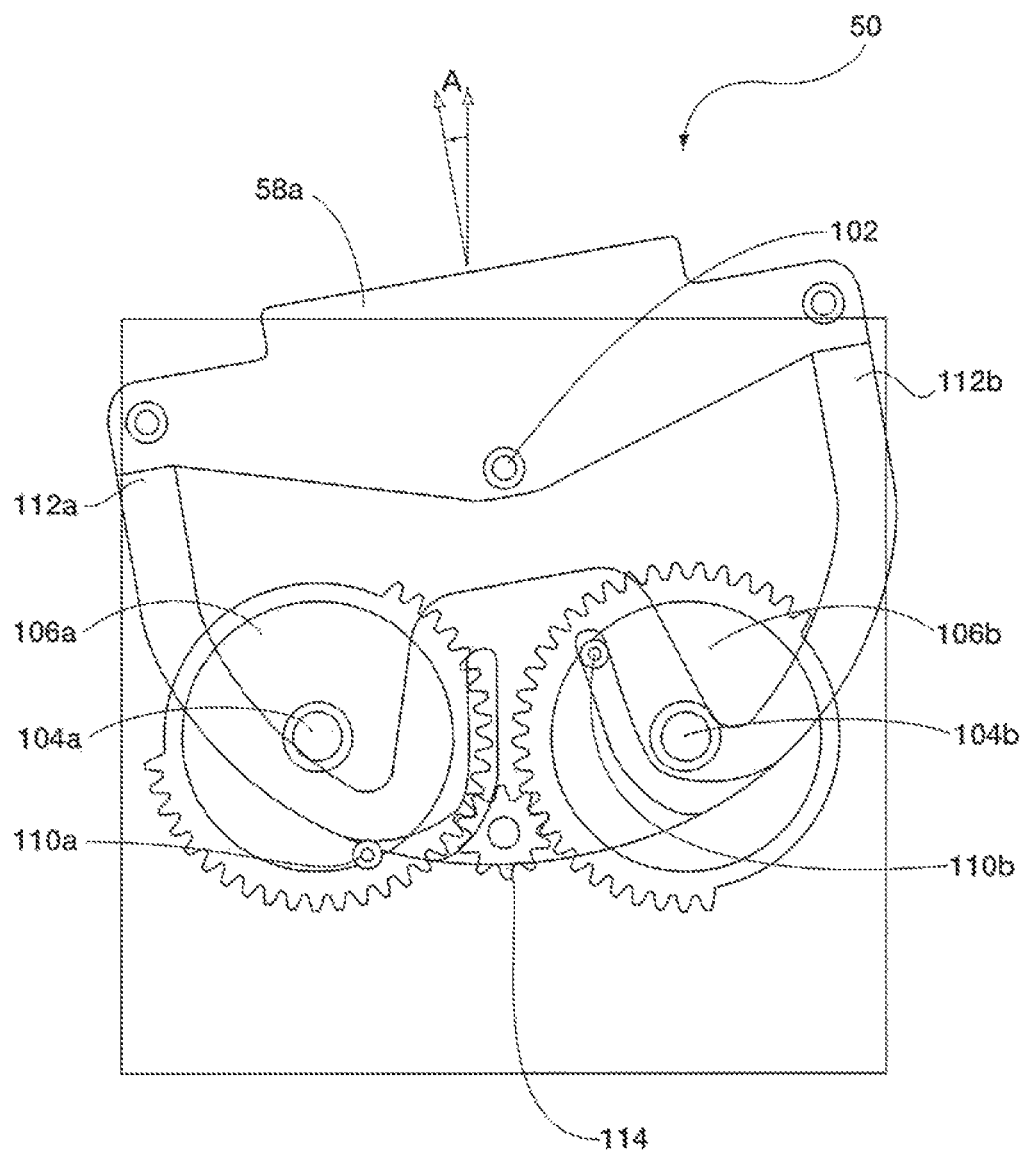

In alternative embodiments, as shown in FIG. 5A, a tilting mechanism 50 includes at least one gear 106a having at least one cam 110a for tilting the carrying tray 40 toward at least one side of the conveyor. The tilting mechanism 50 is typically mountably attached to a portion of the cart 20, usually the support 58a, and engages with a camway 112a. The camway 112a may be at least partially housed within a support 58a. The cam 110a may be rotatable around an axis of rotation 104a between about 0 and about 360 degrees. The cam 112a may travel to varying degrees around the axis of rotation 104a, for example, between about 0 and 140 degrees, 0 and 120 degrees, 0 and 90 degrees and/or a combination or other degrees in between.

In another embodiment, the tilting mechanism 50 may further include an extension or camway 112a or second camway 112b, a second gear 106b having a second cam 110b, wherein the second cam 110b is rotatable around an axis of rotation 104b between about 0 and about 360 degrees. The cam 110b may travel to varying degrees around the axis of rotation 104b, for example, between about 0 and 140 degrees, 0 and 120 degrees, 0 and 90 degrees and/or a combination or other degrees in between.

In alternative embodiments, as shown in FIG. 5A, a tiltable support 58a is shown in a substantially non-tilted position on the axis of tilt 102. In this position, the support 58a is supporting the tray 40 in a substantially neutral position. The support 58a may include one or more camways 112a and 112b extending substantially horizontally and/or substantially vertically throughout the mechanism 50. The cams 110a and 110b move within and/or without the camways 112a and 112b, respectively, as the gears 106a and 106b are rotated around their axis of rotations 104a and 104b when movement is activated by a gear drive 114. As the cams 110a and 110b move within the camways 112a and 112b, the tiltable support, and thus the supported tray 40, is tilted around the axis of tilt 102.

Figure 6A:
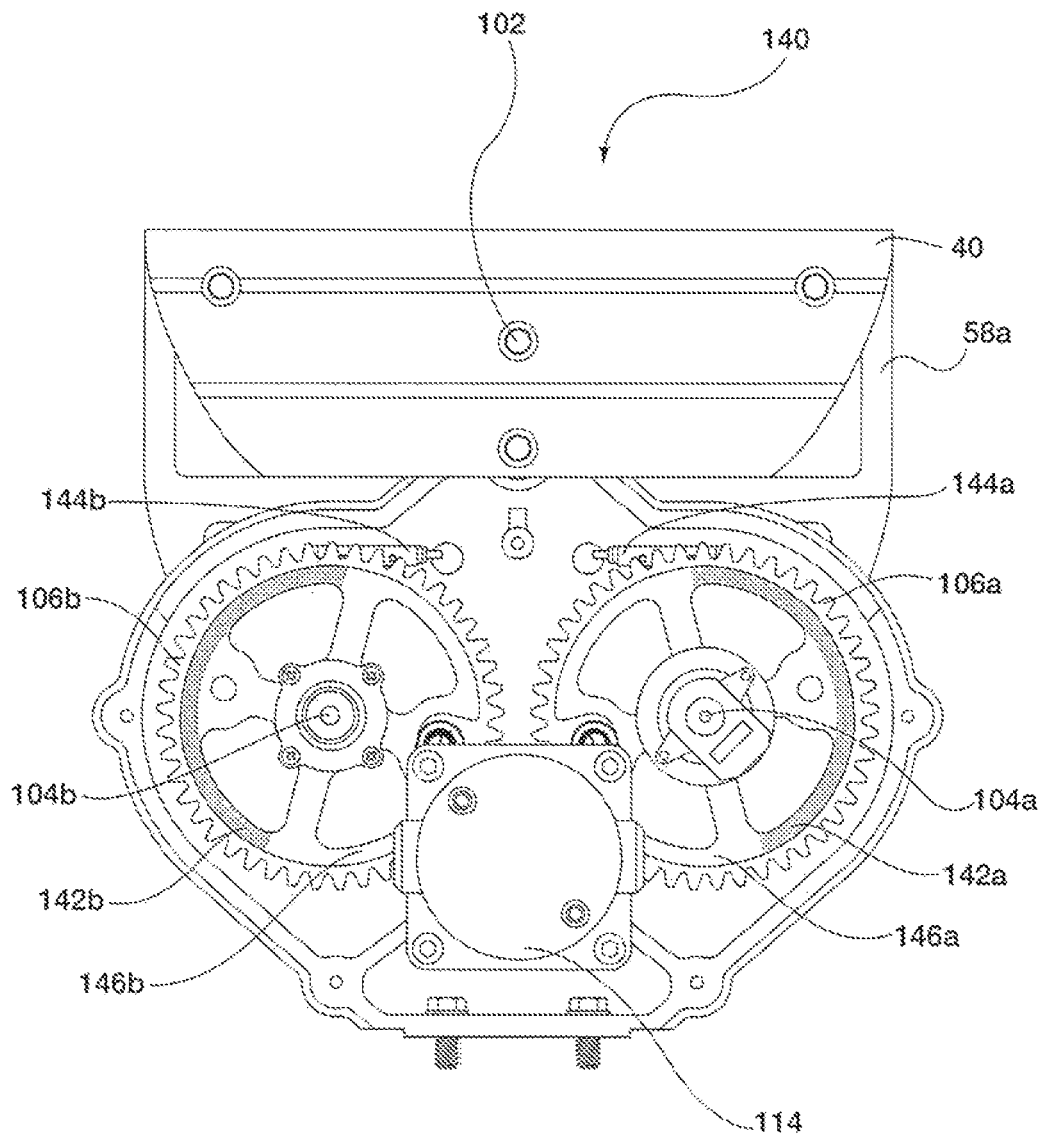
FIG. 6A shows one embodiment of a tilt sensor when the tray is in a neutral position.

As seen in FIG. 6A, the conveyor cart 20 may also include a tilt sensor 140 for determining the direction of tilt of the tray 40. The tilt sensor includes switch 144a. The tilt sensor may be a dual tilt sensor and include switches 144a and 144b. The tilt sensor may also include an array of switches. The tilt sensor 140 may be adapted to operate as a direction indicator. The tilt sensor 140 may also or otherwise be adapted to operate as a positioning indicator. The tilt sensor 140 may be configured to sense a reference area 142a/142b on a corresponding gear 106a/106b.

The switches 144a and 144b may be, by way of example, non-contact sensors that operate in a closed, and alternatively, an open position. As will be recognized by one of skill in the art, a variety of sensors may operate to provide similar feedback about reference areas on one or more gear, however, shown, to provide an example, in FIG. 6A are switches 144a and 144b that close upon the presence of a metal reference point 142a and 142b and remain open when in the presence of a non-metal reference point 146a and 146b.

Figure 5C:
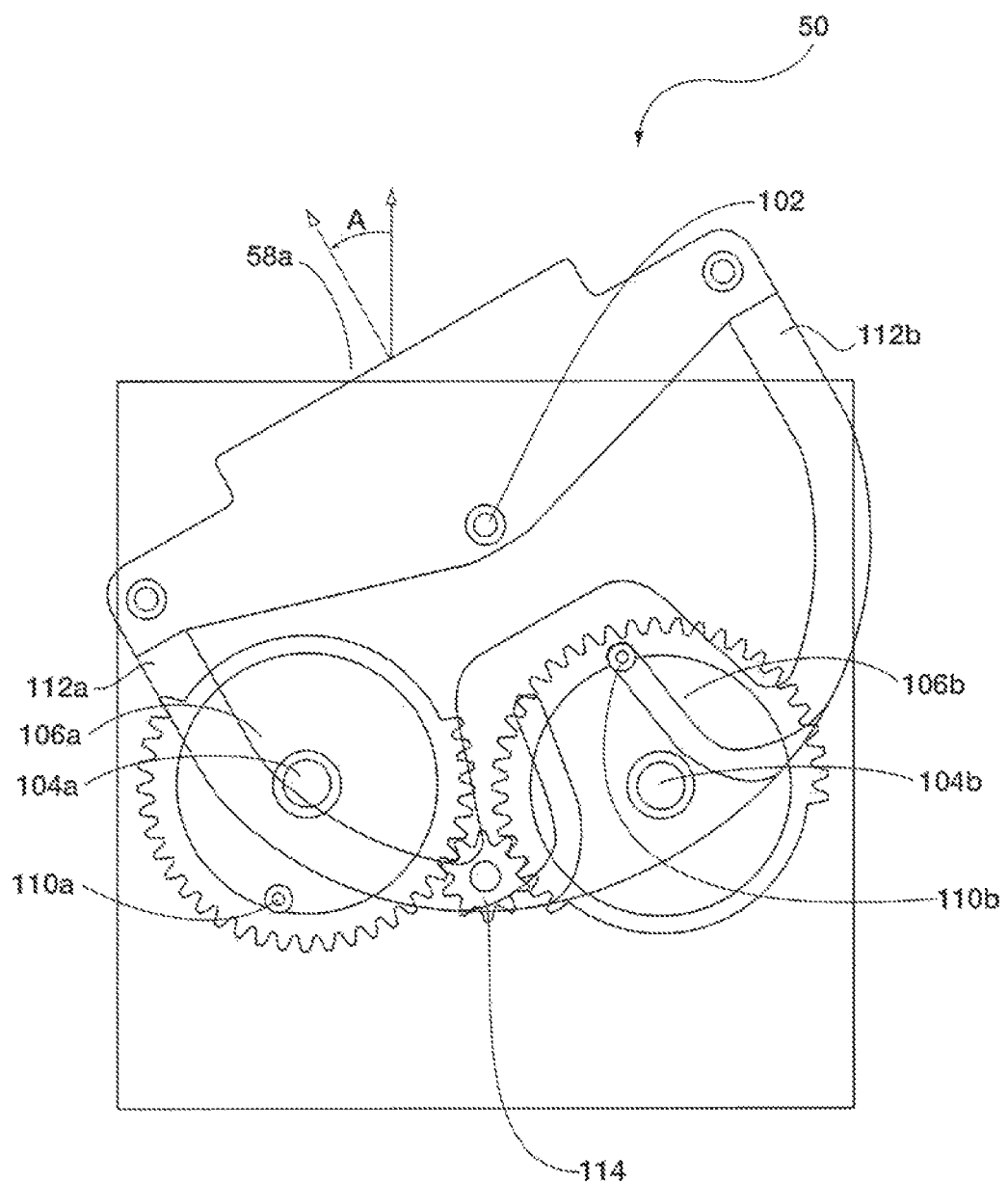
Figure 5D:
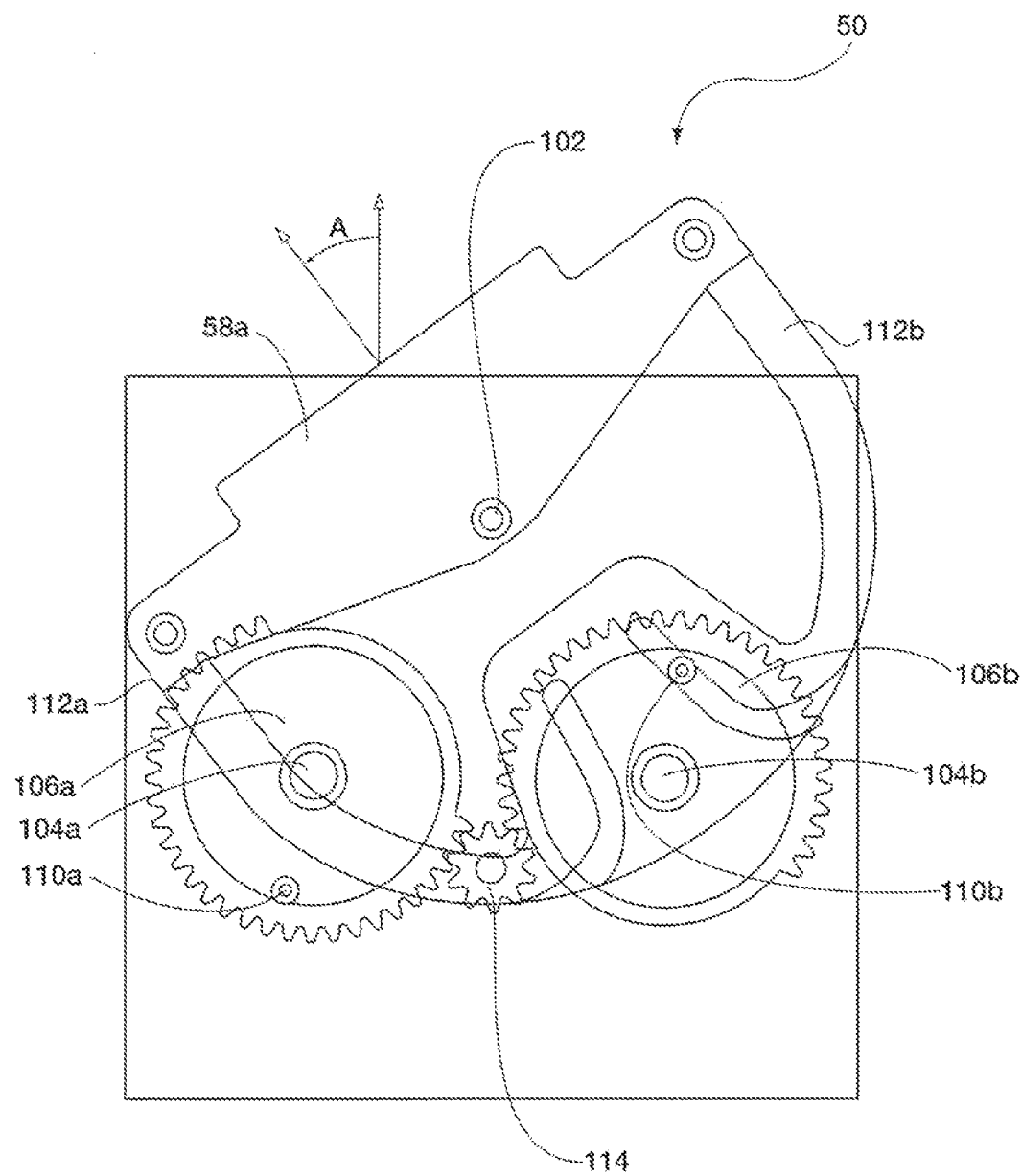
Figure 5E:
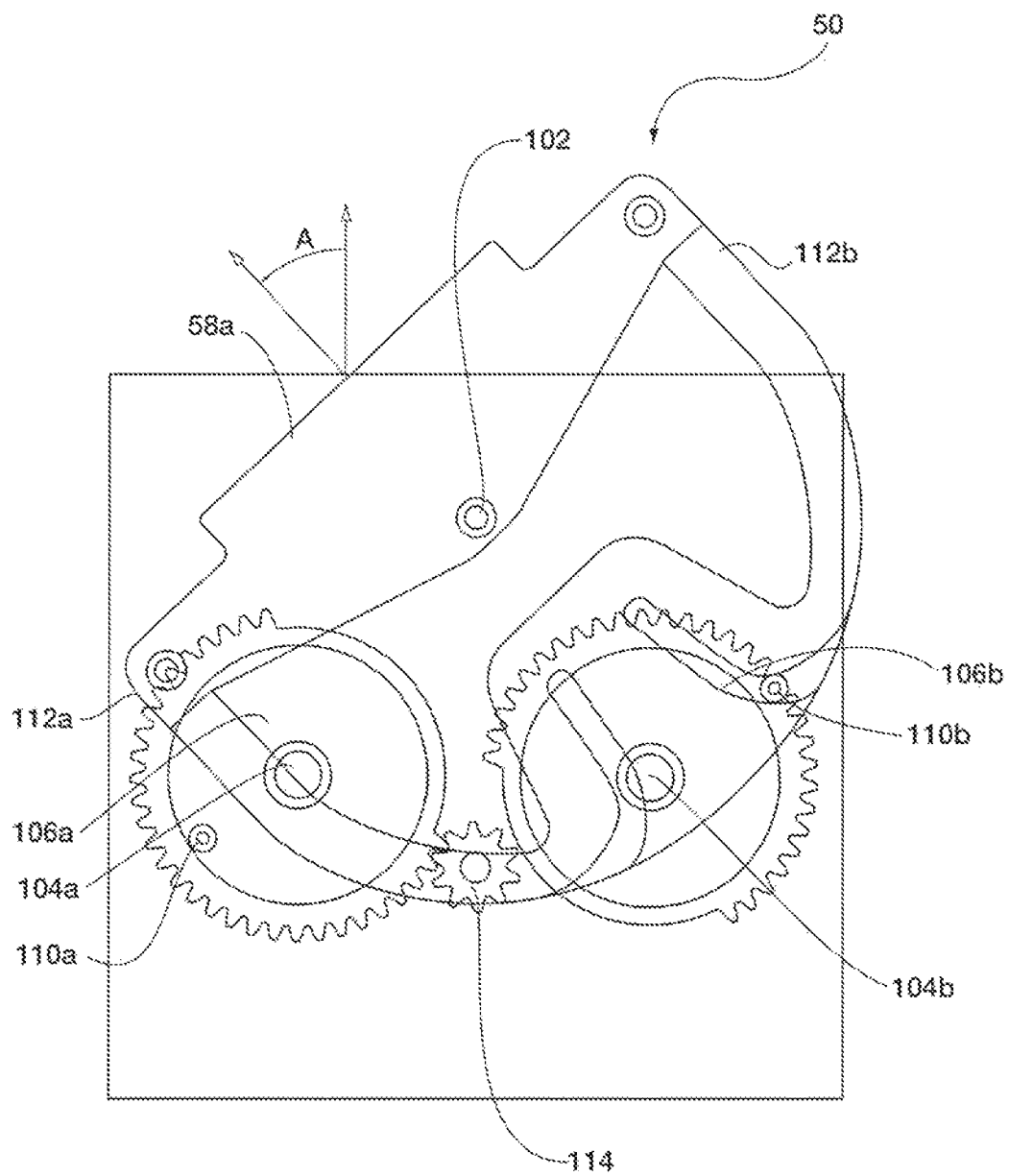
Figure 6B:
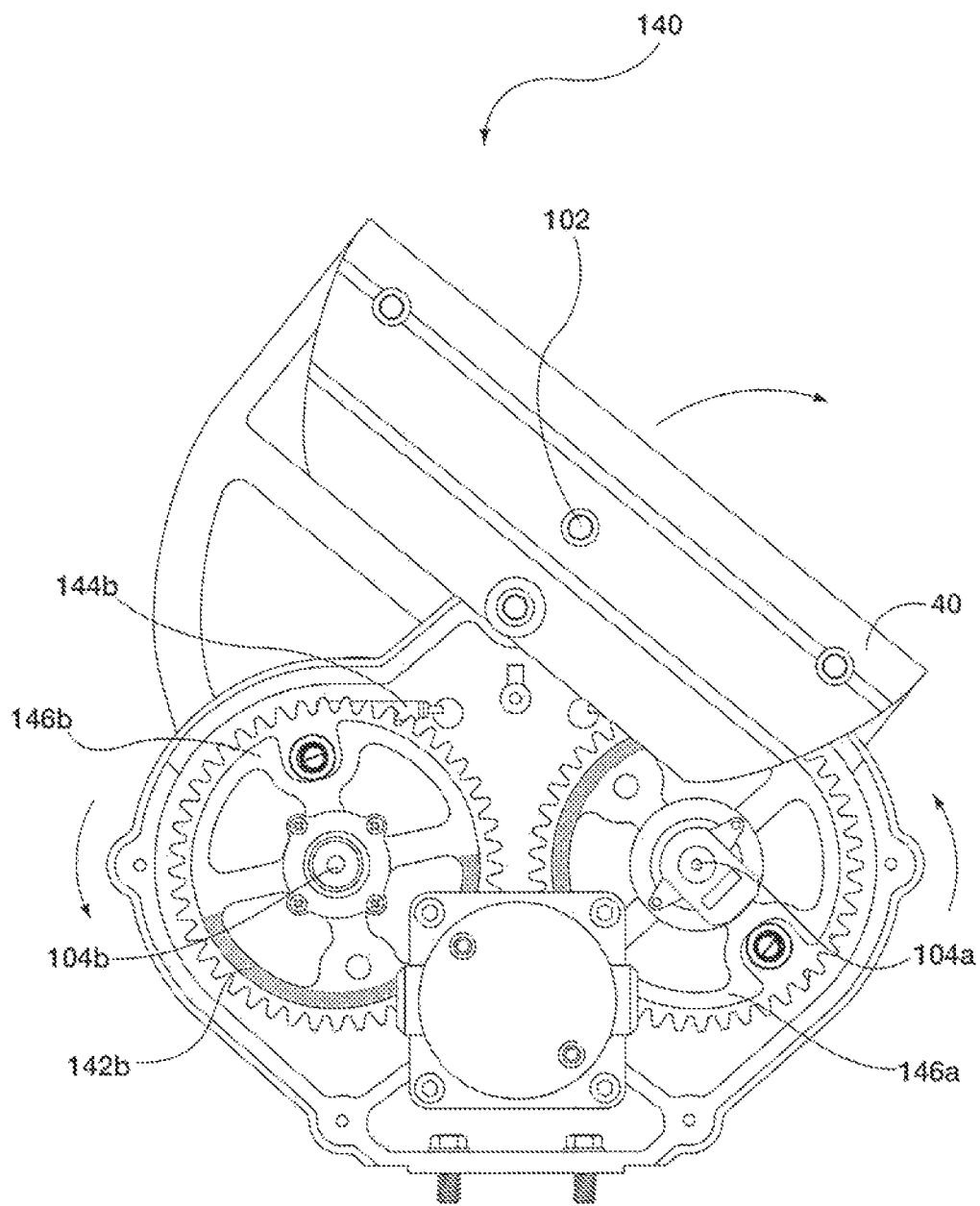
FIG. 6B shows one embodiment of a tilt sensor when the tray is in a tilted position.

In alternative embodiments, as shown in FIGS. 5A-5E, 6A-6C, and 7, a cart 20 may include the tray 40, the support 58a, the gears 106a, the gear drive 114 and the drive device 115. In FIG. 6B, the drive gear is shown actuating in a counterclockwise direction and causing the gears 106a and 106b to turn about their axis of rotation in an opposite, clockwise direction. As the gears begin to rotate, the associated cams 110a and 110b also rotate and move along their respective camways 112a and 112b. Movement of the cams in the camways allows the support to tilt along the pivot axis.

Rotation clockwise of the gears causes upward movement of cam 110b in camway 112b and downward movement of cam 110a in camway 112a. At approximately 45 degrees of rotation, the cam 110b has reached the peak of camway 112b while the cam 110a has begun to exit the internal camway 112a located within the support 58a. As can be seen, this configuration allows for significant movement of the cams within the camways prior to instigating tilting of the support 58a and the tray 40. When the trays begin to tilt, the tilting mechanism 50 may come under significant load attempting to deposit packages 11. Applicant has found that allowing the drive gear to ramp up movement prior to experiencing the load during tilt, may significantly increase efficiency and accuracy of the tray tilt. Applicant also recognizes that ramping down movement, for example the drive gear, prior to returning the tray to the neutral position, may contribute to increased efficiency and accuracy of the tray tilt as well.

Figure 6C:
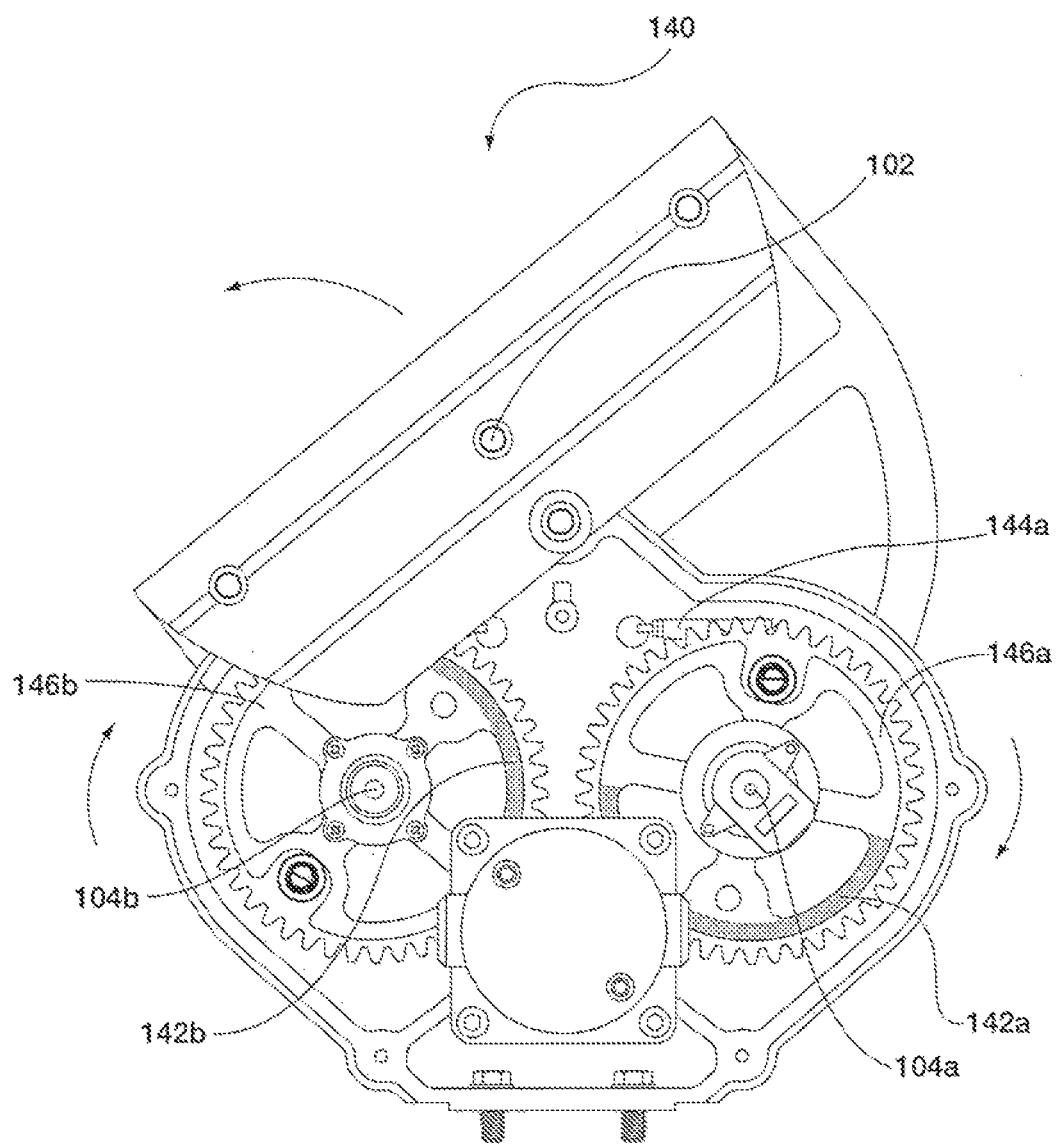
FIG. 6C shows one embodiment of a tilt sensor when the tray is in a tilted position opposite that seen in FIG. 6B.
Figure 7:
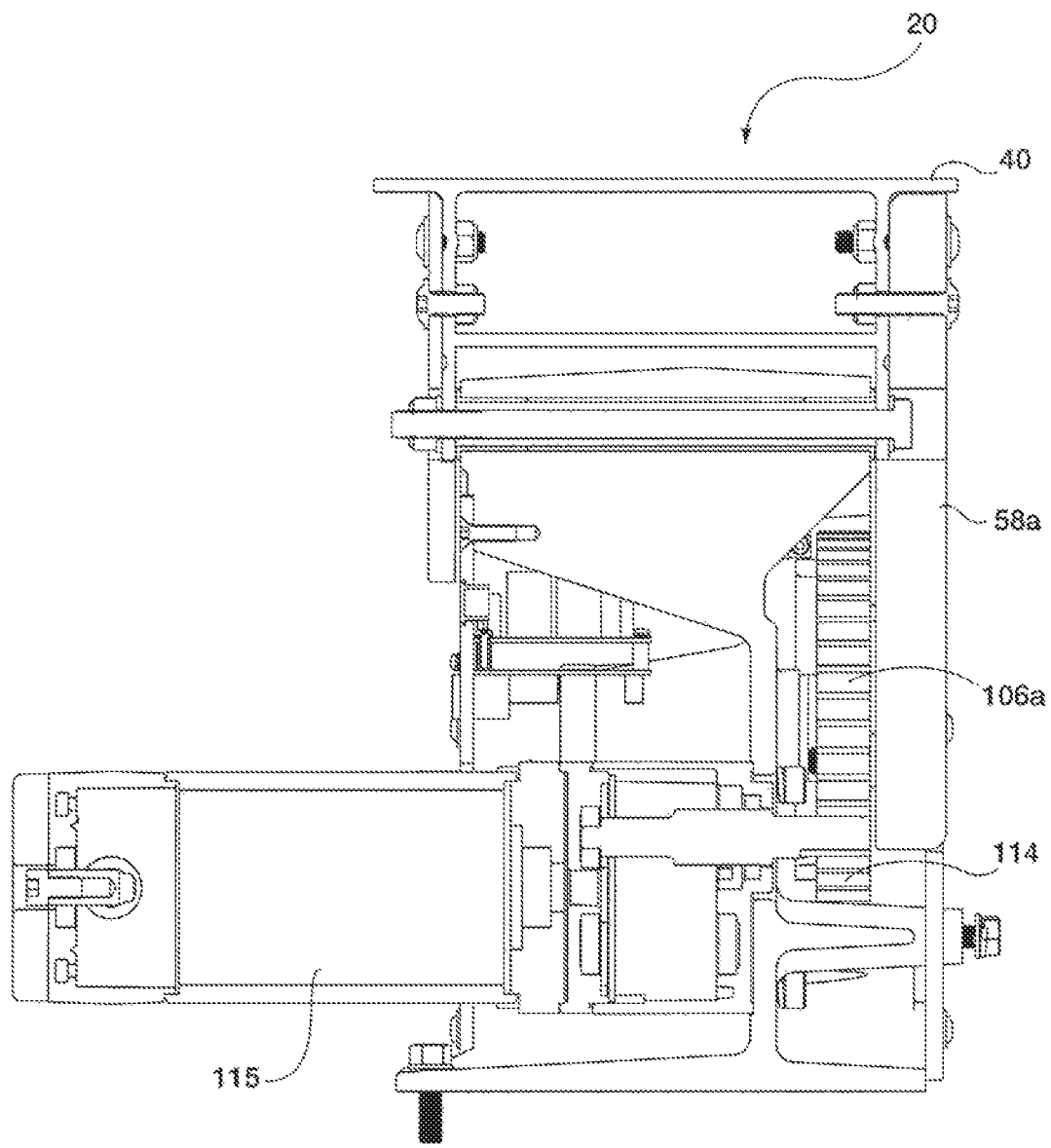
FIG. 7 is a cross-sectional side view of one embodiment of the tilting mechanism of the present inventions.
Figure 9:
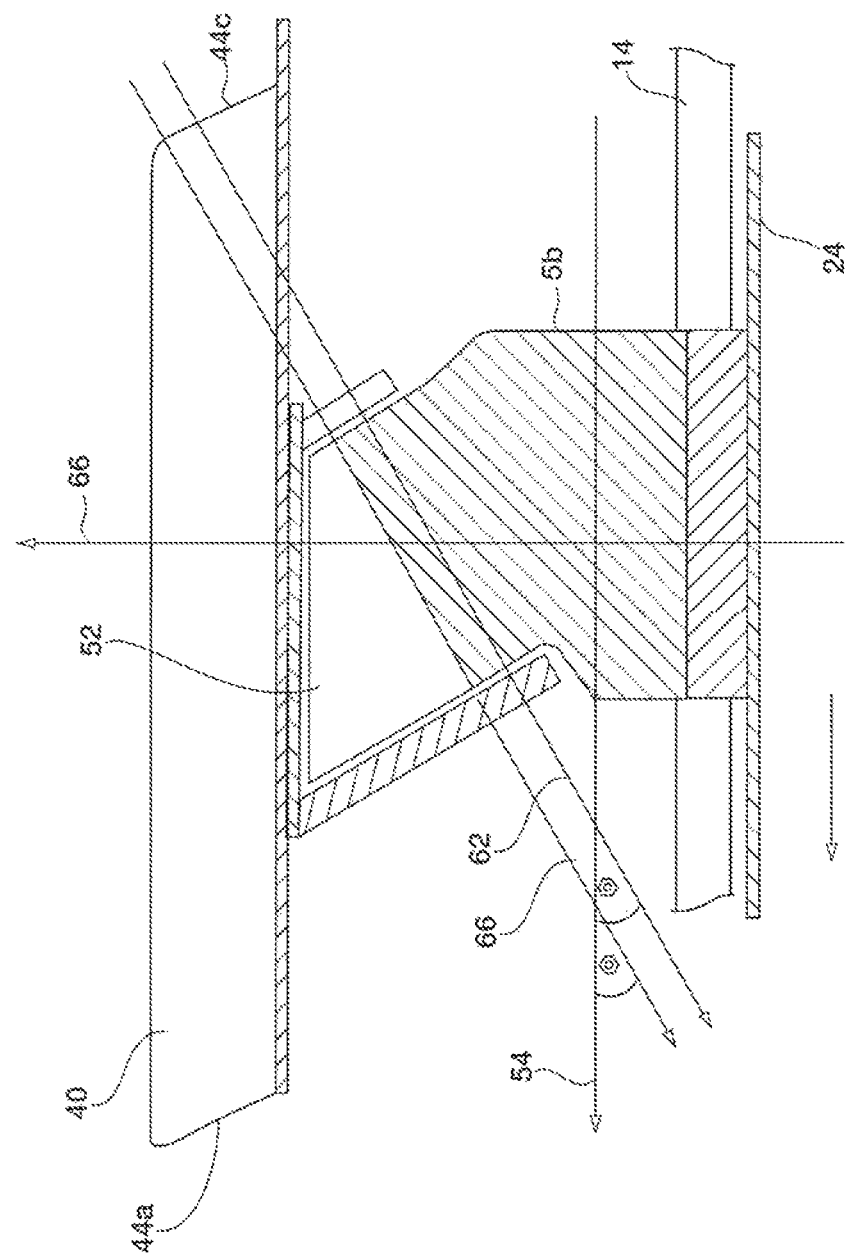
FIG. 9 is a side view of one embodiment of a tilting conveyor cart.

In alternative embodiments, FIGS. 5C, 5D and 5E show continued clockwise movement of the gears 106a and 106b by approximately 90 degrees so that cam 110a has traveled downward in camway 112a and proceeded substantially horizontally to exit the internal camway. Cam 110b originally proceeding upward in its camway, is now directed to move back down the camway and out into an extreme position at approximately 135 degrees of gear rotation allowing for left (or counterclockwise) tilt of the tray 40 to about 45 degrees from its neutral position, adequate for depositing a package 11 carried on the tray 40. This movement allows the drive gear 114 to ramp down as the tray reaches maximum tilt and the gears 106a and 106b approach maximum rotation sufficient to accomplish desired tray tilt. The gears 106a and 106b operate in a reverse fashion about the axis of rotation 104a and 104b to return the cams to the idle state where the tray 40 is locked in a neutral position. Turning to FIGS. 6A-6C, the rotation of the gears may be monitored by the tilt sensor 140 and the information gathered by the tilt sensor and stored or processed by a controller (not shown), the controller, for example being a microprocessor, which is conventional in the art. The controller may also be used to track all packages 11 moving on the conveyor 10 and to automatically signal at the appropriate time when a particular package 11 reaches its destination unloading station or outfeed chute 18. The controller may further be connected, remotely or directly, to other features in the disclosure, such as, the tilting mechanism 50, the tilt sensor 140 and/or the opposed roller motor assembly 210.

Figure 10:
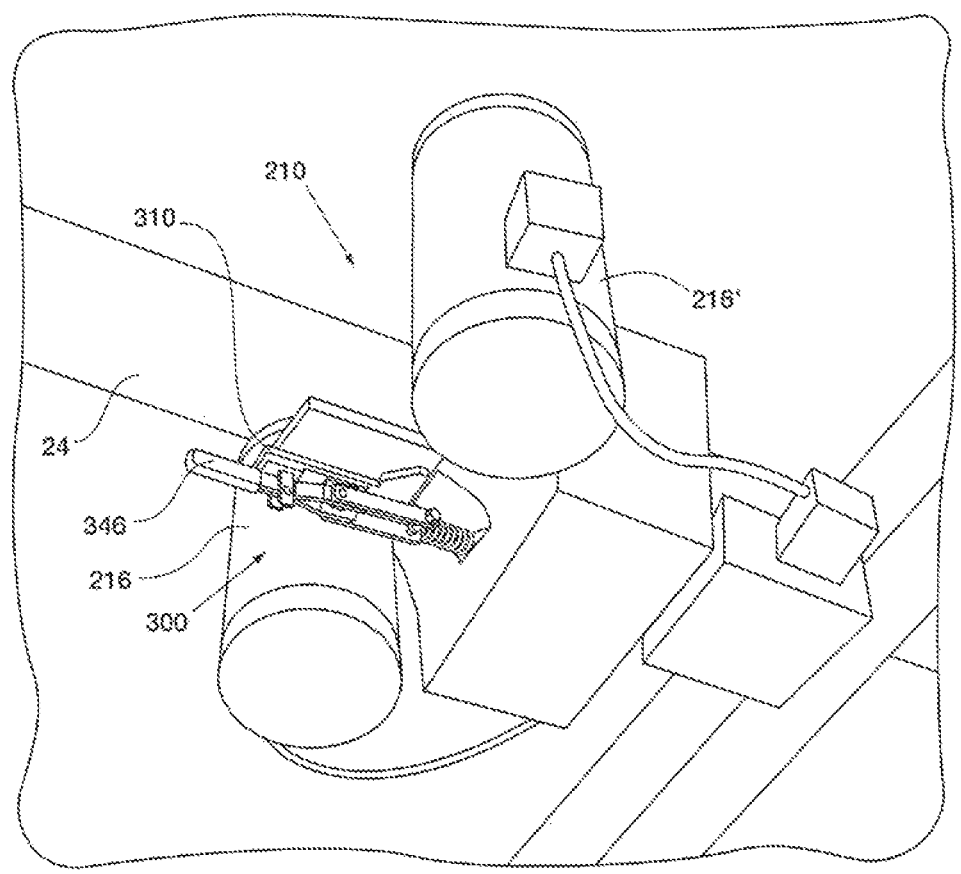
FIG. 10 is a bottom perspective view of the opposed motor roller assembly, with the track elements omitted for clarity.

Additionally, the invention may further include a drive motor for moving the conveyor carts around the track. The drive motors may include an opposed roller motor assembly 210, which move the conveyor carts along the conveyor track 12 by the opposed roller motor assembly. The opposed roller motor assembly 210 of the sorter conveyor 10, which is shown in FIG. 10, may be a pair of opposed drive roller assemblies 214, 214', which is discussed in more detail in FIGS. 11 and 12. A driven fin 36, which is attached to the bottom of each conveyor cart 20, hangs between the two drive roller assemblies 214, 214'.

Composed of semi-rigid, high coefficient aluminum or other conductive metal, the vertical fin 36 preferably has swept-back front 36a and rear 36b edges, as shown in FIG. 4, giving the fin 36 a generally parallelogram shape to reduce damage in the event the fin would contact a structure and to distribute the air gap over the length of the drive rollers to reduce noise and maintain more constant thrust. Specifically, because the gap is angled with respect to the roller, the roller does not hit the gap like a pot hole that is large enough for both wheels to hit at the same time.

Vertically orienting the fin 36 and the opposed roller assembly 210 also reduces problems with maintaining proper spacing between the fin 36 and the drive rollers, because gravity ceases to be a factor as the weight of the live load varies. This results in the fin 36 being easily maintained equidistant between the two drive rollers.

The opposed roller motor assembly 210 ordinarily moves the train of conveyor carts 20 in one direction of travel; however, it can also be reversed if necessary to slow or stop the conveyor.

In one exemplary embodiment, the opposed motor roller assembly 210 of the present inventions is comprised of a pair of support frames 212, 212', a pair of opposed drive roller assemblies 214, 214', and a pair of motor assemblies 216, 216'. The second drive roller assembly 214' provides the opposing surface that exerts pressure in conjunction with the first drive roller 214 on the driven fin 36 of the cart 20.

Figure 11:
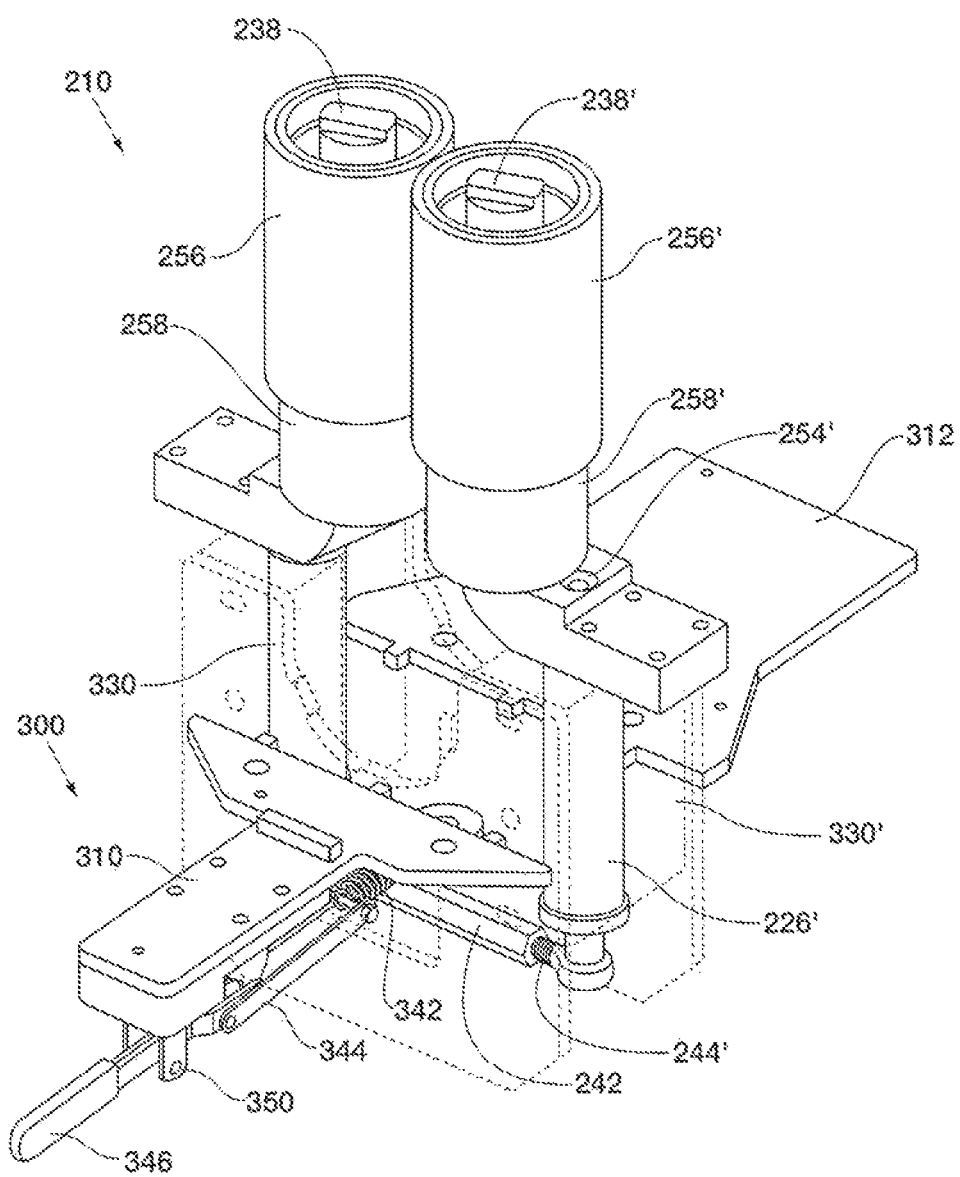
FIG. 11 is a perspective view of an isolated opposed motor roller assembly, with the elements shown in phantom and omitted for clarity.

As shown in FIGS. 10 and 11, opposed motor roller assembly 210 and self-tensioning adjustment assembly 300 generally tie movement of the rollers together. For instance, as one roller moves closer, or away, from the driven fin, the opposing roller mirrors the first rollers movement. Thereby, the drive rollers contact the driven fin simultaneously from each side to be self-centering.

Typically, the opposed roller motor assembly 210 may include a cantilevered, drive roller 214 that is connected to first pivot block assembly 330 and second pivot block assembly 330' to position drive roller 214. The pair of motor assemblies 216, 216' may be mounted on respective pivot block assemblies 330, 330' and are connected to the shafts of motor assemblies 216, 216', for instance with drive belts 262, 262'. Further, self-tensioning adjustment assembly 300 is generally affixed to base 222 and includes self-tension clamp plate weldment 310 to position the pivot block assemblies about a centered position relative to self-tensioning adjustment assembly 300.

Self-tensioning adjustment assembly 300 generally maintains opposed motor assembly 210 in perpendicular contact with the driven fin. For instance, self-tensioning adjustment assembly 300 minimizes, or prevents, twisting as the driven fin moves from one drive roller 214 to another. Additionally, self-tensioning adjustment assembly 300 maintains drive roller 214 in a neutral position with respect to driven fin 36 and guide wheels 30. In this manner, the guide wheels will not comprise the reactive pressure of drive roller 214.

As shown in FIG. 10, lever arm 346 is connected to self-tension clamp plate weldment 310 which allow adjustment of the two pivot block assemblies. As illustrated, lever arm 346 may adjust both first pivot block assembly 330 and second pivot block assembly 330'. In other examples, the first pivot block assembly 330 and second pivot block assembly 330' may be coupled together with the self-tensioning adjustment assembly 300, for instance so that movement of each pivot block assembly mirrors movement of the opposing pivot block assembly about a centered position.

FIG. 11 shows one embodiment of an isolated opposed motor roller assembly 210 that is connected to first pivot block assembly 330 and second pivot block assembly 330'. First pivot block assembly 330 and second pivot block assembly 330' position drive roller 210 adjacent to one surface of the extended driven fin. A pair of support frames 212 and base 222 are attached to the conveyor track 12 (see e.g. FIG. 1 or FIG. 4B for track 12) and self-tensioning assembly 300. Self-tensioning assembly 300 may be connected to base 222 through a weldment, for instance drive clamp plate 310. Similarly, a second weldment, for instance a drive clamp plate 312 as introduced in FIG. 13, may secure the first pivot block assembly 330 and/or second pivot block assembly 330'.

Pivot block assemblies 330, 330' may be further connected forward of the first shafts 226, 226' with a compression linkage 242. In this particular embodiment, the first end 244 of compression linkage 242 is connected to pivot block assembly 330, while the second end 244' of compression linkage 242 is connected to pivot block assembly 330'.

Figure 12:
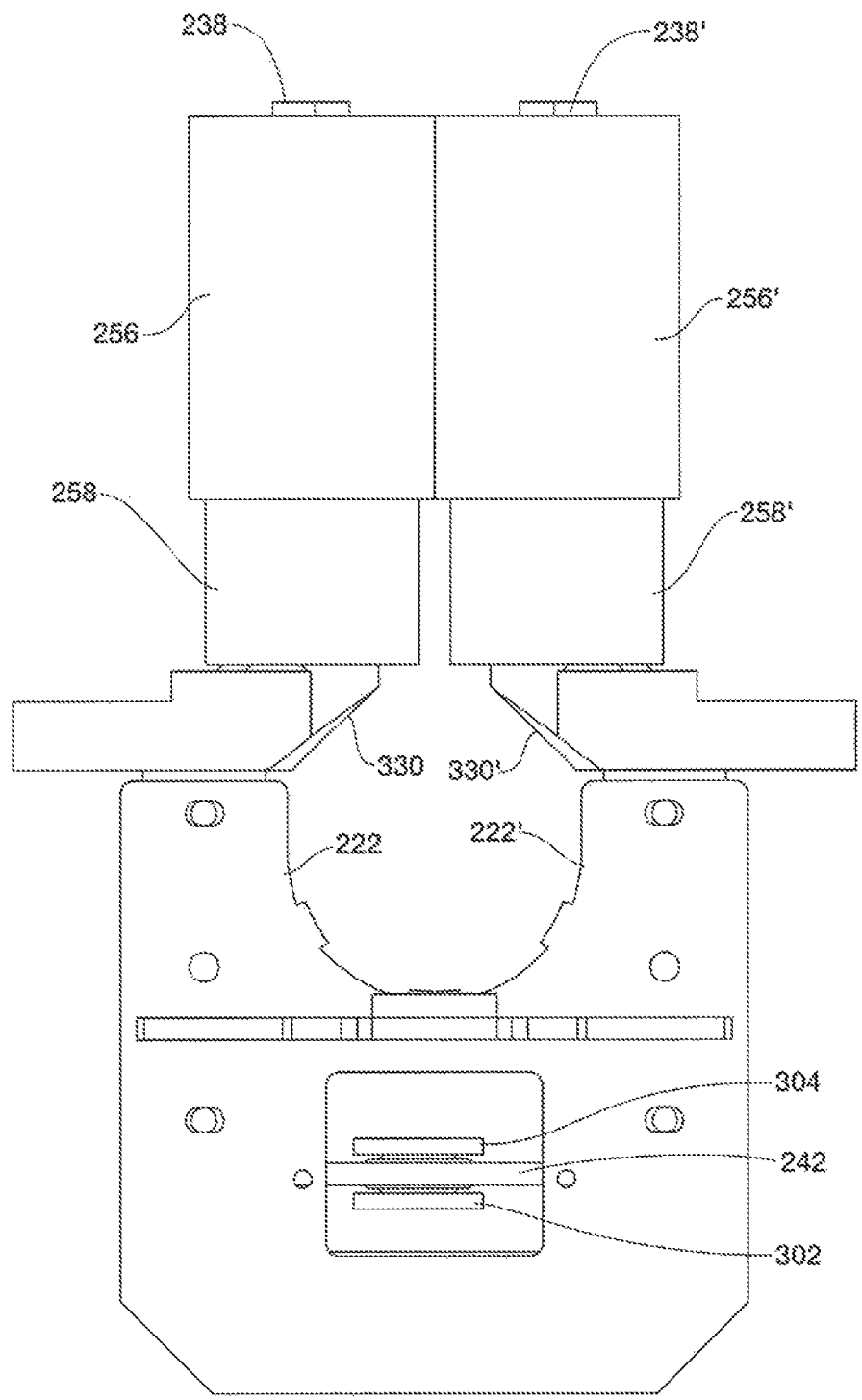
FIG. 12 is an enlarged side perspective view of an isolated opposed motor roller assembly, with elements omitted for clarity.

FIG. 12 illustrates an isolated opposed motor roller assembly embodiment having second shafts 238, 238' which pass through the pivot block assemblies 330,330'. Each pivot block assembly 330,330' includes frictional surfaces 258, 258' at the end nearest the pivot block assemblies 330,330' thereby engaging drive belts 262, 262' and outer elastomeric surfaces 256, 256'. Further, at least one link may be affixed to one of the pivot block assemblies 330,330'. Similarly, a second link may be affixed to the other pivot block assembly 330,330'. For instance, as seen in FIG. 12, a first link 302 and a second link 304 may be positioned on the corresponding pivot block assemblies 330,330'. In some examples, first link 302 and/or a second link 304 may be motor adjustment links. Other examples include a variety of additional intermittent linkage.

Figure 13A:
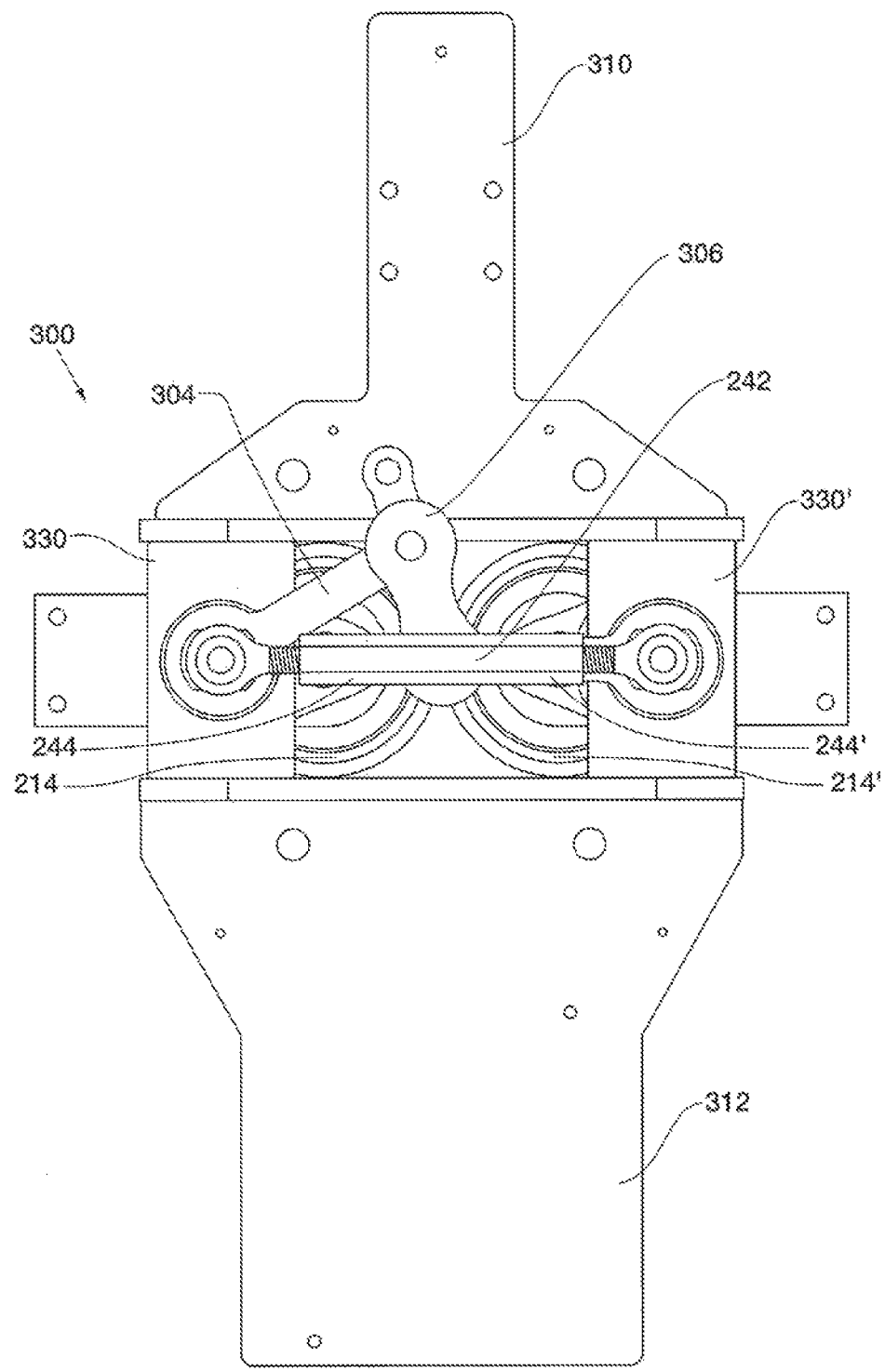
FIG. 13a is an enlarged bottom view of a self-tensioning adjustment assembly and opposed motor roller assembly, with elements omitted for clarity.

FIG. 13*a* shows one embodiment of self-tensioning adjustment assembly 300 and opposed motor roller assembly 210 in an operating position. Self-tensioning adjustment assembly 300 includes first link 302 (see FIG. 13B), second link 304 and connecting linkage to generally position the pair of pivot block assemblies, i.e. first pivot block assembly 330 and second pivot block assembly 300', in alignment with one-another. In yet some other examples, the connecting linkage is a connecting roller link 306, thereby coupling at least one motor adjustment link to a second link as shown in FIG. 13A.

Figure 13B:
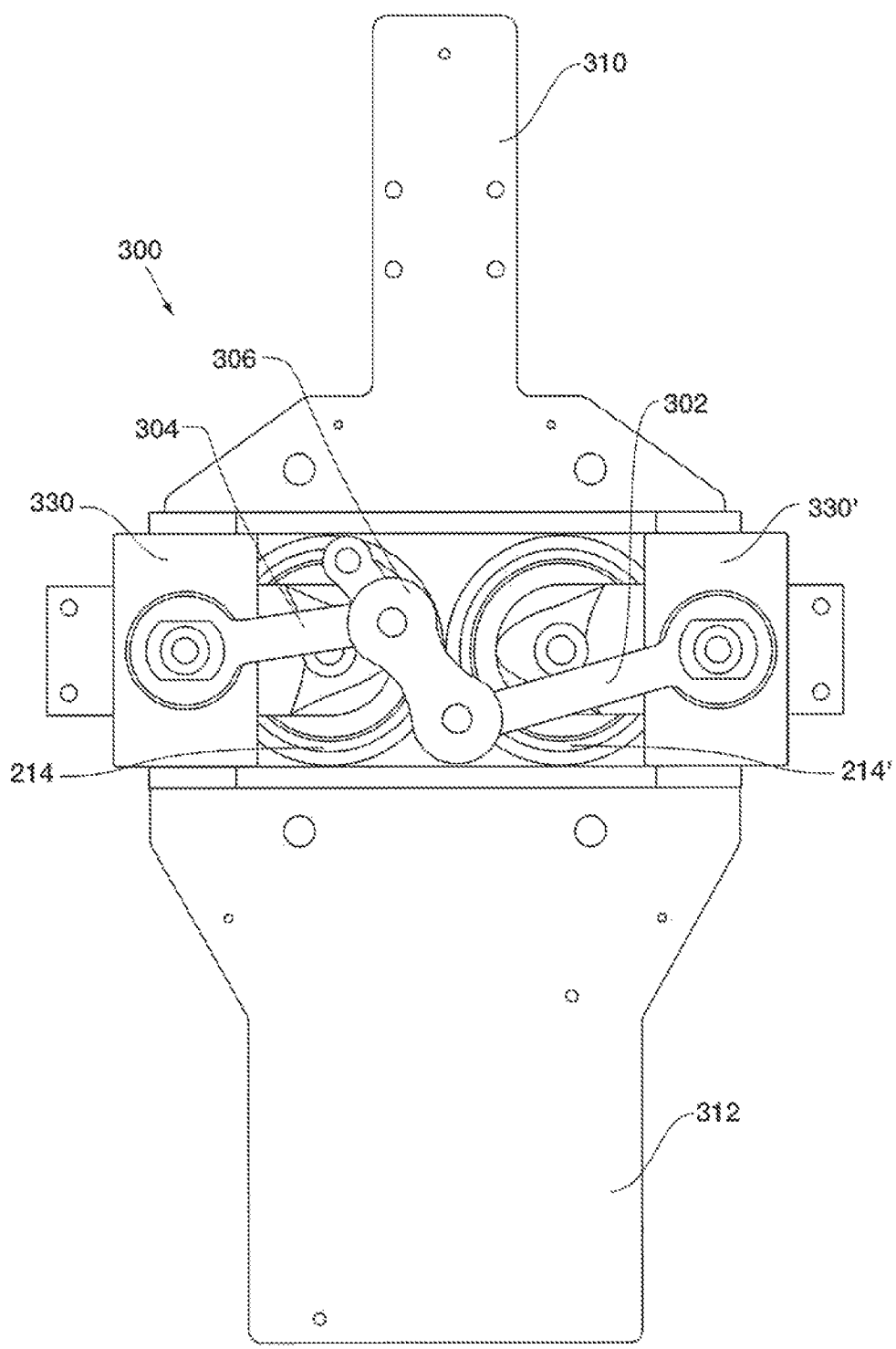
FIG. 13b is an enlarged bottom view of a self-tensioning adjustment assembly and opposed motor roller assembly, with elements omitted for clarity, in a second maintenance position.

FIG. 13*b* shows self-tensioning adjustment assembly 300 and opposed motor roller assembly 210 in one embodiment of a second, maintenance position. Here, first link 302, second link 304 and connecting roller link 306 tie movement of the pivot block assemblies, and associated rollers, together. As shown in this second, maintenance position, each pivot block assembly is positioned adjacent from a centerline and one-anther simultaneously in a mirroring fashion, for instance in the direction of the directional arrows indicated in FIG. 13B. This second position may be beneficial for maintenance, assembly, reassembly or the like.

Figure 14:
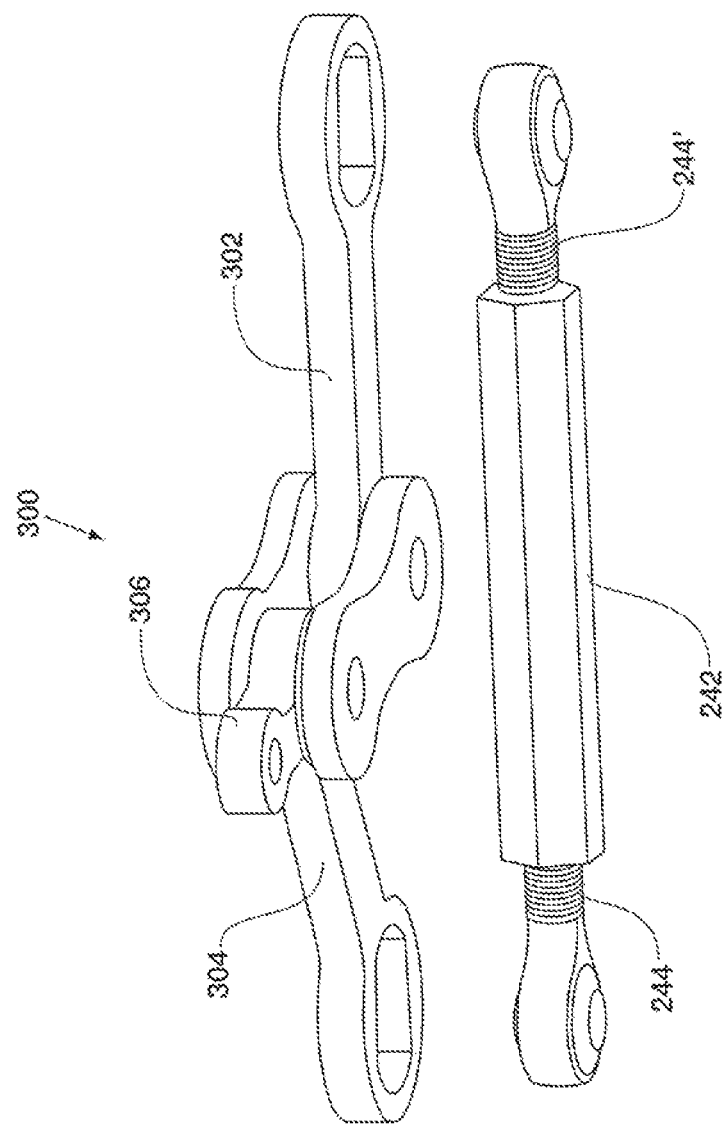
FIG. 14 is an enlarged side perspective view of isolated elements in the self-tensioning adjustment assembly, with elements omitted for clarity.

FIG. 14 illustrates certain isolated elements in self-tensioning adjustment assembly 300. For instance, self-tensioning adjustment assembly 300 may include first link 302, second link 304 and connecting roller link 306 to couple the first link 302 second link 304 in a self-centering movement so that movement of each pivot block assembly mirrors movement of the other pivot block assembly.

Figure 15:
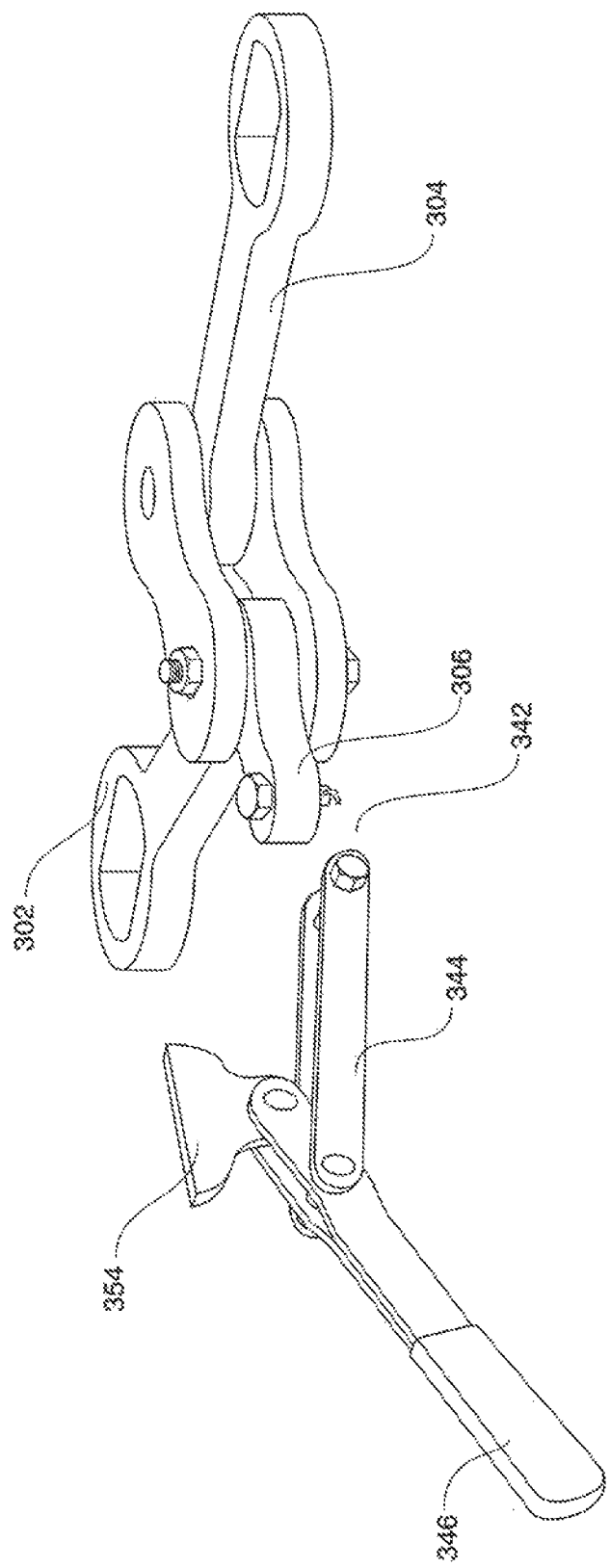
FIG. 15 is another enlarged side perspective view of isolated elements in the self-tensioning adjustment assembly, with elements omitted for clarity.

FIG. 15 further shows isolated elements in self-tensioning adjustment assembly 300. Here, lever 346 is connected to self-tensioning adjustment assembly 300 and is adapted to adjust pivot block assemblies 330,330'. For instance, lever 346 mirrors each pivot block assembly about the other pivot block assembly. Self-tensioning clamp plate 310 may support lever 346. In some examples, self-tensioning clamp plate 310 includes mounting bracket 354 connecting a proximate end of lever 346 to self-tensioning clamp plate 310. A lever retainer may affix lever 346 to self-tensioning clamp plate 310 to retain a distal handling end of lever 346 in an operating position. As shown in FIG. 15, coupling arm 344 may connect lever 346 and the connecting roller link 306. Further, a spring assembly 342 may be positioned and connect coupling arm 344 and connecting roller link 306. As also shown in FIG. 11, spring assembly 342 may include spring 350 connected to self-tensioning clamp plate 310 by a spring linkage.

The drive roller assemblies 214, 214' are generally cylindrical and are made of aluminum or other light-weight alloy. They each have frictional surfaces 258, 258' at the end nearest the pivot block assemblies 330,330' for engaging drive belts 262, 262' and outer elastomeric surfaces 256, 256' of about ¼" thickness on most of the remainder of the surface. The frictional surface 258 is preferably a series of circumferential grooves that mate with the drive belt 262. The drive belt may be a poly v-belt. The outer elastomeric surface is preferably polyurethane with a durometer value (Shore Type A) between about 60 and about 90. In addition, as discussed above, pairs of LIMs, spaced at 80 feet intervals and operated at 480 volts, draws about 15 amps. This is about 90 watts per foot of sorter for about 70 pounds of thrust. Also, a prior art chain drive would draw about 15 watts per foot of sorter for about 1500 pounds of thrust. To the contrary, the present inventions drive rollers are spaced at 160 feet intervals, operate at 480 volts and draw only about four amps. This is only about 12 watts per foot of sorter for about 100 pounds of thrust.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A sorting conveyor for transporting objects and unloading objects at one or more unloading stations adjacent the conveyor, said sorting conveyor comprising:
    (a) a conveyor track;
    (b) a train of conveyor carts connected end-to-end; and
    (c) at least one of said conveyor carts including
        (i) a frame base for engaging said conveyer track,
        (ii) a carrying tray for holding the objects,
        (iii) a support for supporting said carrying tray above said frame base, and
        (iv) a cross-belt assembly for unloading said objects toward at least one side of the conveyor, wherein said cross-belt assembly having a drive roller and a timing belt aligned to and tensioned by said drive roller.

2. The apparatus according to claim 1, including a contact buss rail adapted to power said cross-belt assembly, wherein said buss rail having an interconnect socket assembly and an interchangeable plug assembly adapted to releaseably mate with said socket assembly.

3. The apparatus according to claim 2, wherein said socket assembly includes a receiving aperture.

4. The apparatus according to claim 3, wherein said socket assembly includes a pair of spatially separated apertures on opposing sides of a first connection module.

5. The apparatus according to claim 4, wherein said plug assembly includes at least one hook clasp adapted to protrude through said aperture.

6. The apparatus according to claim 3, wherein said plug assembly includes a second connection module.

7. The apparatus according to claim 5, wherein said plug assembly includes at least one latch adapted to secure said clasp about said socket assembly.

8. The apparatus according to claim 1, wherein movement of said cross-belt assembly in a first direction unloads said object and energizes a subsequent movement of said cross-belt assembly in an opposing second direction.

9. The apparatus according to claim 1, wherein each conveyor cart is independently dischargeable from other conveyor carts.

10. The apparatus according to claim 1, further including a drive motor, a driven member attached to said frame base for moving said conveyor carts around said track, and a cantilevered, drive roller connected to one pivot block assembly and another pivot block assembly.

11. The apparatus according to claim 10, wherein a tension link couples said pivot block assemblies together and movement of each pivot block assembly mirrors movement of the other pivot block assembly.

12. The apparatus according to claim 10, wherein said frame base includes a lower base portion attached to said conveyor track and a self-tensioning adjustment assembly.

13. The apparatus according to claim 1, wherein a drive roller assembly includes a generally cylindrical roller having an outer elastomeric surface for frictionally engaging a driven member.

14. The apparatus according to claim 13, wherein said elastomeric surface is a polyurethane.

15. The apparatus according to claim 10, wherein a motor assembly includes a rotary motor and a drive belt connecting said motor and said drive roller, wherein said drive roller includes a frictional surface.

16. The apparatus according to claim 15, wherein an opposing surface is adjacent to another surface of said driven member.

17. The apparatus according to claim 16, wherein said second drive roller assembly further includes a second motor assembly.

18. The apparatus according to claim 10, wherein said driven member of said frame base comprises a fin moved in the conveyor line of travel by an opposed roller motor assembly.

19. The apparatus according to claim 18, wherein said opposed roller motor assembly and said fin are both vertically oriented beneath said frame base.

20. A sorting conveyor having a conveyor track and at least one conveyor cart comprising:
(a) a frame base for engaging said conveyer track; and
(b) a sortation tray including a (i) belt roller, (ii) a drive roller substantially parallel to said belt roller, (iii) a timing belt aligned to and tensioned by said drive roller, and (iv) a removable transport belt aligned between said belt roller and said drive roller and adapted to unload an object toward a first direction and an opposing second direction.

21. The apparatus according to claim 20, further including a base support supporting an upper slider bed.

22. The apparatus according to claim 21, wherein said transport belt substantially encloses said slider bed in an operating position and being adapted to unload said object in a first direction and an opposing second direction.

23. The apparatus according to claim 21, wherein said base support includes a front plate.

24. The apparatus according to claim 23, further including a lower gap filler adjacent to said front plate.

25. The apparatus according to claim 21, wherein said base support includes a rear plate.

26. The apparatus according to claim 25, further including an upper gap filler adjacent to said rear plate.

27. The apparatus according to claim 20, wherein said sortation tray includes a motor for actuating movement of said transport belt in a first direction and an opposing second direction.

28. The apparatus according to claim 20, wherein said sortation tray includes a control board.

29. The apparatus according to claim 28, wherein said control board energizes a subsequent rotation of said sortation tray in a second direction following a rotation in a first direction to unload said object.

30. The apparatus according to claim 20, wherein said sortation tray includes a take-up roller shoe.

31. The apparatus according to claim 20, further including a buss rail having an interconnect assembly and a corresponding interchangeable assembly adapted to releaseably mate with said interconnect assembly to power said sortation tray.

32. The apparatus according to claim 31, wherein said interconnect assembly includes an engagement plate secured about said sortation tray and having at least one alignment aperture and a first connection module.

33. The apparatus according to claim 32, wherein said interconnect assembly includes a pair of spatially separated apertures on opposing sides of said first connection module.

34. The apparatus according to claim 32, wherein said interchangeable assembly includes at least one hook clasp and a second connection module.

35. The apparatus according to claim 34, wherein said interchangeable assembly includes a pair of spatially separated hook clasps on opposing sides of said second connection module.

36. The apparatus according to claim 34, wherein said interchangeable assembly includes at least one pivotal latch adapted to traverse said clasp in at least one direction.

37. The apparatus according to claim 34, wherein said second connection module includes a mating face configured to interface with said first connection module in an assembled position.

38. The apparatus according to claim 20, including a tracking mechanism adapted to monitor a distance traveled by said transport belt.

39. The apparatus according to claim 20, further including a contactless buss rail.

40. The apparatus according to claim 20, wherein rotation of said sortation tray in a first direction unloads said object in a first direction and energizes a subsequent rotation of said sortation tray in an opposing second direction.

41. The apparatus according to claim 40, wherein rotation in said first direction and said second direction rotate about a common axis of rotation.

42. The apparatus according to claim 20, wherein a plurality of conveyor carts are independently dischargeable from said other trays in a conveyor train.

43. A sorting conveyor for transporting objects and unloading objects at one or more unloading stations adjacent the conveyor, said sorting conveyor comprising:
(a) a conveyor track;

(b) at least one conveyor cart including
  (i) a frame base for engaging said conveyer track,
  (ii) a cross-belt assembly having a drive roller and a timing belt aligned to and tensioned by said drive roller for unloading said objects toward at least one side of the conveyor, and
  (iii) a buss rail adapted to power said cross-belt assembly; and
(c) a drive motor and a driven member for moving said conveyor cart around said track.

44. The apparatus according to claim 43, wherein said buss rail having an interconnect socket assembly and an interchangeable plug assembly adapted to releaseably mate with said socket assembly.

45. The apparatus according to claim 44, wherein said socket assembly includes a pair of spatially separated apertures on opposing sides of a first connection module.

46. The apparatus according to claim 45, wherein said plug assembly includes at least one hook clasp adapted to protrude through an aperture.

47. The apparatus according to claim 44, wherein said plug assembly includes a second connection module.

48. The apparatus according to claim 46, wherein said plug assembly includes at least one latch adapted to secure said clasp about said socket assembly.

49. The apparatus according to claim 43, wherein movement of said cross-belt assembly in a first direction unloads said object and energizes a subsequent movement of said cross-belt assembly in an opposing second direction.

50. The apparatus according to claim 43, wherein each conveyor cart is independently dischargeable from said other conveyor carts.

51. The apparatus according to claim 43, wherein said driven member attached to said frame base for moving said conveyor carts around said track, and a cantilevered, drive roller connected to one pivot block assembly and another pivot block assembly.

52. The apparatus according to claim 51, wherein a tension link couples said pivot block assemblies together and movement of each pivot block assembly mirrors movement of the other pivot block assembly.

53. The apparatus according to claim 51, wherein said frame base includes a lower base portion attached to said conveyor track and a self-tensioning adjustment assembly.

54. The apparatus according to claim 43, wherein a drive roller assembly includes a generally cylindrical roller having an outer elastomeric surface for frictionally engaging said driven member.

55. The apparatus according to claim 54, wherein said elastomeric surface is a polyurethane.

56. The apparatus according to claim 51, wherein a motor assembly includes a rotary motor and a drive belt connecting said motor and said drive roller, wherein said drive roller includes a frictional surface for receiving said drive belt.

57. The apparatus according to claim 56, wherein an opposing surface is adjacent to another surface of said driven member.

58. The apparatus according to claim 57, wherein said second drive roller assembly further includes a second motor assembly.

59. The apparatus according to claim 51, wherein said driven member of said frame base comprises a fin moved in the conveyor line of travel by an opposed roller motor assembly.

60. The apparatus according to claim 59, wherein said opposed roller motor assembly and said fin are both vertically oriented beneath said frame base.

61. The apparatus according to claim 43, wherein said conveyor cart includes an upper slider bed.

62. The apparatus according to claim 61, wherein a transport belt substantially encloses said slider bed in an operating position.

63. The apparatus according to claim 61, wherein a base support includes a front plate.

64. The apparatus according to claim 63, further including a lower gap filler adjacent to said front plate.

65. The apparatus according to claim 63, wherein said base support includes a rear plate.

66. The apparatus according to claim 65, further including an upper gap filler adjacent to said rear plate.

67. The apparatus according to claim 43, wherein said conveyor cart includes a motor for actuating movement of said transport belt.

68. The apparatus according to claim 43, wherein said conveyor cart includes a control board.

69. The apparatus according to claim 43, including a first filler portion and a second filler portion configured to collectively form a tray gap filler, wherein each filler portion extends toward one another to interface over at least part of a gap formed between two adjacent conveyor carts on said conveyor track.

70. The apparatus according to claim 69, wherein said first filler portion and said second filler portions each include a horizontally extended end forming an apex.

71. The apparatus according to claim 70, wherein said tray gap filler is adapted to alternate between a first position where said apex of said first filler portion and said second filler portion overlap at a medial part while the gap is maintained at the more distal ends of said gap, and a second position where the overlap of said first filler portion and said second filler portion extends to at least one of the more distal ends of said gap.

* * * * *